United States Patent
Komatsu et al.

(10) Patent No.: US 6,524,383 B2
(45) Date of Patent: Feb. 25, 2003

(54) METHOD FOR MANUFACTURING PIGMENT DISPERSION, PIGMENT DISPERSION OBTAINED BY THIS METHOD, AND INK JET RECORDING INK USING SAME

(75) Inventors: Hidehiko Komatsu, Nagano (JP); Hiroto Nakamura, Nagano (JP); Hitoshi Ohta, Nagano (JP); Masahiro Yatake, Nagano (JP); Kazuhiko Hara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/083,701

(22) Filed: Oct. 19, 2001

(65) Prior Publication Data
US 2003/0019398 A1 Jan. 30, 2003

Related U.S. Application Data

(63) Continuation-in-part of application No. PCT/JP01/01364, filed on Feb. 23, 2001.

(51) Int. Cl.$^7$ .......................... C09D 17/00; C09D 11/00; C09B 67/20
(52) U.S. Cl. ................. 106/493; 106/31.6; 106/31.75; 106/31.77; 106/31.8; 106/31.85; 106/31.86; 106/31.89; 106/31.9; 106/410; 106/412; 106/472; 106/473; 106/474; 106/476; 106/494; 106/495; 106/496; 106/497; 106/498; 106/499; 347/100
(58) Field of Search .............................. 106/410, 412, 106/472, 473, 474, 476, 493, 494, 495, 496, 497, 498, 499, 31.6, 31.75, 31.77, 31.8, 31.85, 31.86, 31.89, 31.9; 347/100

(56) References Cited

U.S. PATENT DOCUMENTS 5,837,045 A * 11/1998 Johnson et al. ............ 106/31.6

FOREIGN PATENT DOCUMENTS

| EP | 0859037 | 8/1998 |
|----|---------|--------|
| JP | 07258578 | 10/1995 |
| JP | 07258598 | 10/1995 |
| JP | 83498 | 1/1996 |
| JP | 8238596 | 9/1996 |
| JP | 1049974 | 2/1998 |
| JP | 10110110 | 4/1998 |
| JP | 10110111 | 4/1998 |
| JP | 10110114 | 4/1998 |
| JP | 10120958 | 5/1998 |
| JP | 10195331 | 7/1998 |
| JP | 10195360 | 7/1998 |
| JP | 10237349 | 9/1998 |
| JP | 10265704 | 10/1998 |
| JP | 10330665 | 12/1998 |
| JP | 53902 | 2/2000 |

OTHER PUBLICATIONS

Patent Abstracts of Japan Publication No. 10265704 A dated Oct. 6, 1998.
Patent Abstracts of Japan Publication No. 07258578 A dated Oct. 9, 1995.
Patent Abstracts of Japan Publication No. 07258598 A dated Oct. 9, 1995.
Patent Abstracts of Japan Publication No. 08003498 A dated Jan. 9, 1996.
Patent Abstracts of Japan Publication No. 08238596 A dated Sep. 17, 1996.
Patent Abstracts of Japan Publication No. 1049974 A dated Feb. 20, 1998.
Patent Abstracts of Japan Publication No. 10110110 A dated Apr. 28, 1998.
Patent Abstracts of Japan Publication No. 10110111 A dated Apr. 28, 1998.
Patent Abstracts of Japan Publication No. 10110114 A dated Apr. 28, 1998.
Patent Abstracts of Japan Publication No. 10120958 A dated May 12, 1998.
Patent Abstracts of Japan Publication No. 10195331 A dated Jul. 28, 1998.
Patent Abstracts of Japan Publication No. 10195360 A dated Jul. 28, 1998.
Patent Abstracts of Japan Publication No. 10237349 A dated Sep. 8, 1998.
Patent Abstracts of Japan Publication No. 10330665 a dated Dec. 15, 1998.
Patent Abstracts of Japan Publication No. 2000053902 A dated Feb. 22, 2000.

* cited by examiner

*Primary Examiner*—Anthony J. Green
(74) *Attorney, Agent, or Firm*—Ladas & Parry

(57) ABSTRACT

Disclosed is a pigment dispersion that can be used for an ink jet printing-use pigment ink that affords stable printing characteristics and has excellent storage stability in an ink jet printer having a head driven at a high frequency and having finer nozzles in order to enhance image quality and raise the speed. Disclosed is also a method for manufacturing this pigment dispersion. This manufacturing method includes a step of surface-treating a self-dispersing type of pigment, in which at least hydrophilic, dispersibility-imparting group is introduced to the pigment surface directly and/or via a polyvalent group, and a step of dispersing the self-dispersing pigment obtained in said surface-treating step in an aqueous medium, wherein the dispersion step is a step in which at least the self-dispersing pigment, a wetting agent, and water are dispersed in the form of a liquid mixture.

20 Claims, No Drawings

METHOD FOR MANUFACTURING PIGMENT DISPERSION, PIGMENT DISPERSION OBTAINED BY THIS METHOD, AND INK JET RECORDING INK USING SAME

This application is a continuation continuation-in-part of copending is International Application PCT/JP01/01364 filed on Feb. 23, 2001, which designated the U.S., was not published in English, claims the benefit thereof and incorporates the same by reference.

TECHNICAL FIELD

This invention relates to a method for manufacturing a pigment dispersion, to the pigment dispersion obtained by this method, and to a pigment ink in which this pigment dispersion is used. The pigment dispersion of the present invention and the pigment ink in which this pigment dispersion is used can be used to advantage for ink jet printer inks that are discharged from a recording head by subjecting the ink to discharge energy utilizing mechanical energy (produced with a piezoelectric device or the like) or thermal energy (produced with a heating element). Also, the pigment dispersion of the present invention and the pigment ink in which this pigment dispersion is used can be used in various applications, such as inks for fountain pens, ball-point pens, felt-tip pens, and other writing implements, industrial coating liquids, and paints that are used for airbrushes and so forth.

BACKGROUND ART

In the past, dyes have been mainly used as the colorant for ink jet printer inks, but in recent years the use of pigments has been investigated because of the better durability of pigments. When a pigment is used as a colorant, the recording product has superior water resistance, light fastness, and other aspects of durability as compared to when a dye is used.

Meanwhile, unlike dyes, pigments do not dissolve in water, so when they are used as a colorant for water-based inks, a resin or other such dispersant is adsorbed to the pigment surface and the pigment particles are dispersed in water for use. It is difficult, though, to keep a pigment in a stable dispersed state with an aqueous medium, and the adsorbed dispersant may come off the pigment surface, which can lead to a situation in which the colorant is dispersed in the form of particles, such as when the pigment particles agglomerate together and precipitate or, when the particles are relatively large in diameter, the weight of the pigment particles themselves causes them to precipitate naturally.

Because various solvents, surfactants, and so forth are also generally present in an ink jet printer ink along with the colorant and water, it was difficult to maintain a stable dispersed state with a conventional method in which a resin or other such dispersant was used to disperse pigment particles in an aqueous medium. Also, when a resin-dispersed pigment ink was used in continuous printing, the resin would adhere around the nozzles of the ink jet head, and this built-up resin would deflect the ink trajectory, or resin would dry and solidify within the nozzles as the water evaporated, and this would lead to poor discharge.

In view of this, various techniques have been proposed for obtaining self-dispersing pigments by imparting water dispersibility to the pigment itself. For instance, in Japanese Laid-Open Patent Applications H10-195360, H10-330665 and elsewhere it has been proposed a self-dispersing carbon black in which carboxyl groups, carbonyl groups, sulfone groups, hydroxyl groups, or other such hydrophilic groups are bonded, either directly or via polyvalent groups, to the surface of carbon black; in Japanese Laid-Open Patent Applications H8-3498, H10-195331, H10-237349, and elsewhere it has been proposed that dispersibility can be improved by oxidizing the surface of carbon black; and in Japanese Laid-Open Patent Applications H8-283598, H10-110110, H10-110111, and elsewhere it has been proposed a surface-treated pigment in which sulfone groups have been introduced at the surface of an organic pigment.

Also, Japanese Laid-Open Patent Application H11-49974 discusses the preparation of an organic pigment block that is positively charged on the surface by using an organic pigment block in which sulfqne groups have been introduced and treating it with monovalent metal ions, and also discusses a water-based ink composition with excellent storage stability, which contains water, a dispersant, and pigment microparticles prepared from this organic pigment block with a positively charged surface.

Further, Japanese Laid-Open Patent Application 2000-53902 proposes an ink in which the colorant consists of pigment particles (giant molecule chromophores) having water-solubilizing functional groups and a polymer on their surface, which is accomplished by interposing benzene rings introduced into carbon black.

Various ink properties are required of a ink used in an ink jet printer, but it is especially important to ensure the storage stability of the ink itself and discharge stability during ink jet recording (preventing clogging, deflection and so forth). Excellent quality is also required of the print on the recording paper (such as a printed image with high print density and little bleeding). Specifically, it is desirable for an ink jet printer ink to simultaneously satisfy the above-mentioned ink properties, discharge characteristics, and high print quality.

Because the above-mentioned self-dispersing surface-treated pigment has dispersion groups that work through chemical bonding on its surface, it has excellent storage stability, making it easy to ensure the various characteristics required of an ink jet printer ink as discussed above.

Today, however, an ink jet printer must be capable of printing very fine printed images at high speed, and extremely fine ink dots have to be discharged at a higher frequency. Therefore, the ink that is used is also subject to much more stringent requirements in order to achieve stable printing characteristics. In particular, unlike a dye, with a pigment ink having particles dispersed in the ink, achieving both stable discharge characteristics and good storage stability has become quite difficult even with a self-dispersing pigment ink whose basic characteristics are excellent. Also, since the colorant is still a dispersion system even with a self-dispersing pigment, the problem of settling that occurs when the particles are large in diameter remains unsolved.

It is therefore an object of the present invention to provide a self-dispersing pigment dispersion with which stable printing characteristics can be obtained even with today's high-quality, high-speed ink jet printers, and with which storage stability and high print quality can be ensured and natural precipitation of the pigment can be kept to a minimum.

DISCLOSURE OF THE INVENTION

The inventors conducted diligent research into the conditions for satisfying the above-mentioned printing characteristics, storage stability, and precipitation characteristics required of an ink jet printer ink in the manufacture of pigment dispersions that make use of these self-dispersing pigments, whereupon they discovered that it is of the utmost importance to add a suitable wetting agent ahead of time and perform the dispersion treatment in this mixed state in the step of dispersing in an aqueous medium a self-dispersing pigment that has been surface treated. The present invention is based on this finding.

Therefore, the method of the present invention for manufacturing a pigment dispersion comprises the steps of surface-treating a self-dispersing type of pigment, in which at least a hydrophilic, dispersibility-imparting group is introduced to the pigment surface directly and/or via a polyvalent group, and dispersing the self-dispersing pigment obtained in the surface treatment step in an aqueous medium, wherein this method for manufacturing a pigment dispersion is characterized in that the dispersion step is a step in which at least the self-dispersing pigment, a wetting agent, and water are dispersed in the form of a liquid mixture.

In a preferred embodiment of the present invention, a surface tension of the mixture in the dispersion step is no more than 40 mN/m.

In a preferred embodiment of the present invention, a pigment concentration of the mixture in the dispersion step is no more than 50 wt %.

In a preferred embodiment of the present invention, the wetting agent in the dispersion step is one or more substances selected from the group consisting of acetylene glycols, acetylene alcohols, glycol ethers, and alkylene glycols.

In a preferred embodiment of the present invention, a total amount of acetylene glycol and/or acetylene alcohol added as a wetting agent in the dispersion step is at least 1/50 and no more than 2 times the amount of pigment by weight.

In a preferred embodiment of the present invention, the acetylene glycol and acetylene alcohol are compounds expressed by the following Formulas I and II.

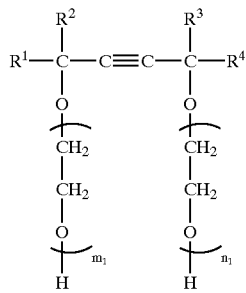
(I)

(Where $R^1$, $R^2$, $R^3$, and $R^4$ are each independently an alkyl group, and $m_1+n_1$ is a number from 0 to 30.)

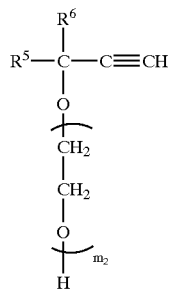
(II)

(Where $R^5$ and $R^6$ are each independently an alkyl group, and $m_2$ is a number from 0 to 30.)

In a preferred embodiment of the present invention, the hydrophilic, dispersibility-imparting group is one or more types selected from the group consisting of functional groups expressed by the following formulas and salts thereof. —OM, —COOM, —CO—, —SO$_3$M—, —SO$_2$M, —SO$_2$NH$_2$, —RSO$_2$M, —PO$_3$HM, —PO$_3$M$_2$, —SO$_2$NHCOR, —NH$_3$, —NR$_3$ (where M is a hydrogen atom, alkali metal, ammonium, or organic ammonium, and R is a $C_1$ to $C_{12}$ alkyl group, a substitutable phenyl group, or a substitutable naphthyl group).

In a preferred embodiment of the present invention, the hydrophilic, dispersibility-imparting group is a sulfur-containing dispersibility-imparting group.

In a preferred embodiment of the present invention, a total amount of polyvalent metal ions contained in the liquid components of the pigment dispersion is 600 ppm or less.

In a preferred embodiment of the present invention, amounts of silicon, calcium, magnesium, iron, chromium, and nickel ions contained in the liquid components of the pigment dispersion manufactured by the above manufacturing method are each 100 ppm or less.

In a preferred embodiment of the present invention, the pigment is a carbon black pigment and/or an organic pigment.

In a preferred embodiment of the present invention, the pigment is one or more pigments selected from the group consisting of C.I. pigment yellow, C.I. pigment red, C.I. pigment violet, C.I. pigment blue, C.I. pigment orange, C.I. pigment green, and C.I. pigment brown.

In a preferred embodiment of the present invention, the pigment is one or more pigments selected from the group consisting of phthalocyanine pigment, quinacridone pigment, condensed azo pigment, isoindolinone pigment, quinophthalone pigment, anthraquinone pigment, benzimidazolone pigment, and perylene pigment.

In a preferred embodiment of the present invention, a macromolecular substance is introduced to the pigment surface directly or via the polyvalent group in the surface-treating step.

The pigment dispersion of the present invention is characterized by being manufactured by the above-mentioned manufacturing method.

The pigment ink of the present invention is characterized by containing at least the above-mentioned pigment dispersion.

The recording method of the present invention is characterized by comprising a step of imparting energy to the above-mentioned ink so that the ink is discharged from a recording head and adheres to a recording medium.

In a preferred embodiment of the present invention, the energy is a mechanical energy.

In a preferred embodiment of the present invention, the energy is a thermal energy.

The recording product of the present invention is characterized by being recorded by the method discussed above.

In this Specification, the term "self-dispersing pigment" refers to a pigment such that the pigment particles are able to disperse in a solvent by itself. This is not a pigment that is dispersed by adsorbing a resin or the like to the pigment particle surface, and rather indicates a self-dispersing surface-treated pigment that is capable of dispersing in water due to hydrophilic, dispersibility-imparting groups that are chemically bonded to the pigment particle surface (this will sometimes be referred to as a "surface-treated pigment" in this Specification).

Using a self-dispersing surface-treated pigment such as this as an ink colorant allows the content of dispersant, such as the resin dispersants used in the past, to be reduced, which lowers the viscosity of the ink and makes clogging less apt to occur, and since there are fewer limitations on additives, a surfactant can be added so as to obtain a quick-drying ink that permeates more quickly into the recording medium. Also, the pigment (which is the colorant) content can be correspondingly increased because less dispersant is added, which means that at a given pigment concentration, a higher print density can be obtained than with a conventional resin-dispersed or surfactant-dispersed ink, which affords better image quality with higher color expression. It should be noted that the term "pigment particle" as used in this Specification basically means "pigment secondary particle."

The "wetting agent" referred to in this Specification is added in the course of creating the dispersion by dispersing the surface-treated pigment obtained in the surface treatment step, or a slurry, wet cake, or the like of the surface-treated pigment, in an aqueous medium (particularly ion exchange water or distilled water), and has the effect of improving the miscibility (wettability) of the pigment particles with the dispersant. It also has the effect of raising the dispersion efficiency by increasing the contact resistance between the pigment and the dispersion medium or between the pigment particles in the dispersant. As a result, the shear conditions of the apparatus can be made less severe in the dispersion step (that is, the shear force to which the pigment dispersion is subjected by the apparatus can be lowered), and it is possible to shorten the time it takes for the dispersion treatment.

In this Specification, the term "liquid components" of the ink refers to the liquid portion when the ink is divided into a solid portion, consisting of pigment particles and so forth, and a liquid portion in which this solid portion is dispersed and held. Therefore, these "liquid components" also include any impurities that may be admixed into the vehicle (the liquid portion of the ink itself) in the preparation of the ink. Also, the ink can be separated by centrifugation, for instance, into a supernatant component and a precipitated component, and this supernatant component can be subjected to a suitable known measurement method to measure the amounts of silicon, calcium, magnesium, iron, chromium, nickel, and other such polyvalent metal ions contained in the "liquid components." "Polyvalent metal ions" means metal ions with a valence of two or more.

BEST MODE FOR CARRYING OUT THE INVENTION

The following pigments are examples of pigments that can be used for the pigment dispersion and pigment ink according to the present invention.

Examples of black inorganic pigments include furnace black, lamp black, acetylene black, channel black, and other types of carbon black (C.I. pigment black 7).

Examples of pigments that can be used mainly for yellow inks include C.I. Pigment Yellow 1 (Hansa Yellow G), 2, 3 (Hansa Yellow 10G), 4, 5 (Hansa Yellow 5G), 6, 7, 10, 11, 12 (Disazo Yellow AAA), 13, 14, 16, 17, 24 (Flavanthrone Yellow), 55 (Disazo Yellow AAPT), 61, 61:1, 65, 73, 74 (Fast Yellow 5GX), 75, 81, 83 (Disazo Yellow HR), 93 (Condensed Azo Yellow 3G), 94 (Condensed Azo Yellow 6G), 95 (Condensed Azo Yellow GR), 97 (Fast Yellow FGL), 98, 99 (anthraquinone), 100, 108 (Anthrapyrimidine Yellow), 109 (Isoindolinone Yellow 2GLT), 110 (Isoindolinone Yellow 3RLT), 113, 117, 120 (Benzimidazolone Yellow H2G), 123 (Anthraquinone Yellow), 124, 128 (Condensed Azo Yellow 8G), 129, 133, 138 (Quinophthalone Yellow), 139 (Isoindolinone Yellow), 147, 151 (Benzimidazolone Yellow H4G), 153 (Nickel Nitroso Yellow), 154 (Benzimidazolone Yellow H3G), 155, 156 (Benzimidazolone Yellow HLR), 167, 168, 172, 173 (Isoindolinone Yellow 6GL), and 180 (Benzimidazolone Yellow).

Examples of pigments used for magenta inks include C.I. Pigment Red 1 (Para Red), 2, 3 (Toluidine Red), 4, 5 (1TR Red), 6, 7, 8, 9, 10, 11, 12, 14, 15, 16, 17, 18, 19, 21, 22, 23, 30, 31, 32, 37, 38 (Pyrazolone Red), 40, 41, 42, 88 (Thioindigo Bordeaux), 112 (Naphthol Red FGR), 114 (Brilliant Carmine BS), 122 (dimethylquinacridone), 123 (Perylene Vermilion), 144, 146, 149 (Perylene Scarlet), 150, 166, 168 (Anthanthrone Orange), 170 (Naphthol Red F3RK), 171 (Benzimidazolone Maroon HFM), 175 (Benzimidazolone Red HFT), 176 (Benzimidazolone Carmine HF3C), 177, 178 (Perylene Red), 179 (Perylene Maroon), 185 (Benzimidazolone Carmine HF4C), 187, 188, 189 (Perylene Red), 190 (Perylene Red), 194 (Perynone Red), 202 (Quinacridone Magenta), 209 (Dichloroquinacridone Red), 214 (Condensed Azo Red), 216, 219, 220 (Condensed Azo), 224 (Perylene Red), 242 (Condensed Azo Scarlet), and 245 (Naphthol Red), or C.I. Pigment Violet 19 (quinacridone), 23 (Dioxadine Violet), 31, 32, 33, 36, 38, 43, and 50.

Examples of pigments used for cyan inks include C.I. Pigment Blue 15, 15:1, 15:2, 15:3, 15:4, 15:6 (hereinafter all referred to as Phthalocyanine Blue), 16 (non-metallic Phthalocyanine Blue), 17:1, 18 (Alkali Blue Toner), 19, 21, 22, 25, 56, 60 (Surene Blue), 64 (Dichloroindanthrone Blue), 65 (Violanthrone), and 66 (Indigo) or the like.

Black organic pigments such as Aniline Black (C.I. Pigment Black 1) can be used as organic pigments for black ink.

Examples of organic pigments used for colored inks other than yellow, cyan, or magenta ink include C.I. Pigment Orange 1, 2, 5, 7, 13, 14, 15, 16 (Vulcan Orange), 24, 31 (Condensed Azo Orange 4R), 34, 36 (Benzimidazolone Orange HL), 38, 40 (Pyranthrone Orange), 42 (Isoindolinone Orange RLT), 43, 51, 60 (benzimidazolone insoluble monoazo pigment), 62 (benzimidazolone insoluble monoazo pigment), and 63; C.I. Pigment Green 7 (Phthalocyanine Green), 10 (Green Gold), 36 (Chlorobromophthalocyanine Green), 37, and 47 (Violanthrone Green); and C.I. Pigment Brown 1, 2, 3, 5, 23 (Condensed Azo Brown 5R), 25 (Benzimidazolone Brown HFR), 26 (Perylene Bordeaux), and 32 (Benzimidazolone Brown HFL).

Just one of the above pigments or a combination of two or more may be used in the ink used in the present invention.

The self-dispersing pigment used in the method of the present invention for manufacturing a pigment dispersion is characterized by having been rendered dispersible in water, without a dispersant, by the introduction (chemical bonding)

of functional groups or a salt thereof as hydrophilic dispersibility-imparting groups onto the surface of the pigment particles, either directly or via a polyvalent group.

In the present invention, just one or a plurality of functional groups may be introduced in a single pigment particle. The type of functional group introduced and the degree thereof may be suitably determined while taking into account the dispersion stability in the ink, color density, how fast the ink dries on the front of the ink jet head, and other such factors.

Examples of the functional group introduced as a hydrophilic, dispersibility-imparting group include one or more functional groups selected from the group consisting of functional groups expressed by the following formulas and salts thereof. —OM, —COOM, —CO—, —$SO_3M$—, —$SO_2M$, —$SO_2NH_2$, —$RSO_2M$, —$PO_3HN$, —$PO_3M_2$, —$SO_2NHCOR$, —$NH_3$, —$NR_3$ (In these formulas, M is a hydrogen atom, an alkali metal, ammonium, or organic ammonium, and R is a $C_1$ to $C_{12}$ alkyl group, a phenyl group that may have a substituent, or a naphthyl group that may have a substituent.)

When a hydrophilic dispersibility-imparting group is introduced to the pigment via a polyvalent group, examples of the polyvalent group to which the dispersibility-imparting group is bonded include $C_1$ to $C_{12}$ alkylene groups, substitutable phenylene groups, and substitutable naphthylene groups.

Various known surface treatment means can be employed as the surface treatment means for introducing the hydrophilic dispersibility-imparting groups (the above-mentioned functional groups or salts thereof) onto the surface of the pigment particles directly or via the polyvalent group.

For instance, ozone or a sodium hypochlorite solution can be made to act upon a commercially available oxidized carbon black to further oxidize the carbon black and further render the surface thereof hydrophilic (as in Japanese Laid-Open Patent Applications H7-258578, H8-3498, H10-120958, H10-195331, and H10-237349, for example); carbon black can be treated with 3-amino-N-alkyl substituted pyridium bromide (as in Japanese Laid-Open Patent Applications H10-195360 and H10-330665, for example); an organic pigment can be dispersed in a solvent in which the organic pigment is either insoluble or dissolves poorly, and sulfone groups can be introduced onto the surface of the pigment particles using a sulfonator (as in Japanese Laid-Open Patent Applications H8-283596, H10-110110, and H1-110111, for example); an organic pigment can be dispersed in a basic solvent that forms a complex with sulfur trioxide, and sulfur trioxide can then be added to treat the surface of the organic pigment and introduce sulfone groups or sulfonamide groups (as in Japanese Laid-Open Patent Application H10-110114, for example); or water-solubilizing functional groups and a polymer can be introduced onto the pigment surface by interposing phenylene groups bonded to carbon black through an azo coupling reaction (as in Japanese Laid-Open Patent Application 2000-53902). The above are merely examples, and the means for producing the surface-treated pigment used in the present invention is not limited to those listed here.

As long as it contains a sulfur atom and is a functional group that gives dispersibility in water, there are no particular restrictions on the sulfur-containing dispersibility-imparting group used as the hydrophilic dispersibility-imparting group in the present invention, but specific examples include sulfinic acid ($SO_2^-$) groups and sulfonic acid ($SO_3^-$) groups.

The hydrophilic dispersibility-imparting groups introduced to the self-dispersing pigment as discussed above should be present on at least the particle surface, but may also be contained in the interior of the particles.

Also, the self-dispersing pigment used in the method of the present invention for manufacturing pigment dispersion can have a macromolecular substance introduced (chemically bonded), either directly or via the polyvalent group, to the surface of the pigment particles.

The macromolecular substance can be introduced to the pigment surface with relative ease by interposing polyvalent groups. This reaction is accomplished by an acylation reaction or an ester group nucleophilic substitution reaction, for example.

Specific examples of this macromolecular substance include polyethylene glycol, polypropylene glycol, polytetramethylene glycol, and homologs of these (such as monoaryl ethers or monoalkyl ethers of polyethylene glycol, polypropylene glycol, or polytetramethylene glycol in which the carbon number of the alkyl groups is 1 to 10, amines of methoxypolyethylene glycol, polyvinyl alcohol and copolymers of polyvinyl acetate with polyvinyl alcohol, and polymethacrylic acid). It is preferable for these macromolecular substances to have at least one amine group or hydroxy group at a terminal.

The effects of using the pigment dispersion in which a macromolecular substance has been introduced at the pigment surface as above, and of using an ink containing this pigment dispersion, are that precipitation characteristics are enhanced by the steric hindrance of the macromolecular substance, and fixability to the recording medium during printing is improved, among other benefits.

Next, the wetting agent used in the method of the present invention for manufacturing the pigment dispersion will be described. The wetting agent used in the present invention increases the pigment dispersion efficiency when added in the step of dispersing the surface-treated pigment in the aqueous medium.

The wetting agent has the effect of improving the miscibility (wettability) of the pigment particles with the dispersant when added at least during the dispersion of the surface-treated pigment in the aqueous medium (such as ion exchange water or distilled water), and also has the effect of raising the dispersion efficiency by increasing the contact resistance between the pigment and the dispersion medium or between the pigment particles in the dispersant. As a result, the shear conditions of the apparatus can be made less severe in the dispersion step (that is, the shear force to which the pigment dispersion is subjected by the apparatus can be lowered), and it is possible to shorten the time it takes for the dispersion treatment and to reduce contaminant components such as polyvalent metal ions in the dispersion.

Any wetting agent can be used, with no limitations thereon, as long as it has this effect of raising the dispersion efficiency, but examples of particularly suitable agents include acetylene glycols, acetylene alcohols, glycol ethers, and alkylene glycols. In addition, lower alcohols and nonionic surfactants can be used, and other alcohols, water-soluble organic solvents, anionic, cationic, and amphoteric surfactants, sugars, and so forth can also be used, either singly or in combinations of two or more.

The compounds expressed by the following Formula I or Formula II are specific examples of acetylene glycols and acetylene alcohols that can be used as wetting agents.

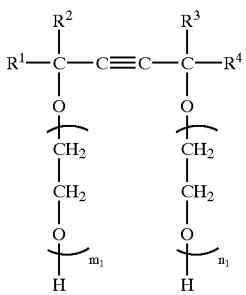

(I)

(In the formula, $R^1$, $R^2$, $R^3$, and $R^4$ are each independently an alkyl group, and $m_1+n_1$ is a number from 0 to 30.)

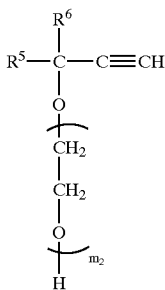

(II)

(In the formula, $R^5$ and $R^6$ are each independently an alkyl, group, and $m_2$ is a number from 0 to 30.)

Specific examples of product names include Surfynol TG, Surfynol 104, Surfynol 420, Surfynol 440, Surfynol 465, Surfynol 485, Surfynol 61, and Surfynol 82 (all made by Air Products), and Acetylenol EH, Acetylenol EL, and Acetylenol EO (all made by Kawaken Fine Chemicals).

The amount in which the acetylene glycol and acetylene alcohol are added in the dispersion step is preferably at least 1/50 and no more than 2 times the amount of pigment by weight. In particular, the dispersion effect will be inadequate if the added amount is less than 1/50, but if a large amount is added (such as more than several times the amount of pigment), a decrease in surface tension will cause the ink to leak and spread out near the ink jet head, making it difficult to ensure stable discharge characteristics.

When the goal is to minimize the amount of wetting agent mixed into the ink, or when the goal is to suppress ink permeability, it is good to use an acetylene alcohol with a low molecular weight as the wetting agent. For instance, when the above-mentioned Surfynol 61 is used as the wetting agent, it will be volatilized when the dispersion is heated after the dispersion step, allowing the remaining amount to be kept to a minimum.

Examples of glycol ethers that can be favorably used as the wetting agent include diethylene glycol mono($C_4$ to $C_8$ alkyl)ether, triethylene glycol mono($C_4$ to $C_8$ alkyl) ether, propylene glycol mono($C_3$ to $C_6$ alkyl)ether, and dipropylene glycol mono($C_3$ to $C_6$ alkyl)ether. Specific examples include diethylene glycol mono-n-butyl ether, triethylene glycol mono-n-butyl ether, propylene glycol mono-n-butyl ether, and dipropylene glycol mono-n-butyl ether. Specific examples of other glycol ethers that can be used include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, ethylene glycol mono-tert-butyl ether, diethylene glycol mono-tert-butyl ether, 1-methyl-1-methoxybutanol, propylene glycol monomethyl ether, propylene glycol monoethyl ether, propylene glycol mono-tert-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, and dipropylene glycol mono-isopropyl ether.

Examples of alkylene glycols that can be used as the wetting agent include 1,2-($C_4$ to $C_{10}$ alkyl)diols, 1,3-($C_4$ to $C_{10}$ alkyl)diols, 1,5-($C_4$ to $C_{10}$ alkyl)diols, and 1,6-($C_4$ to $C_{10}$ alkyl)diols. Specific examples include 1,2-pentanediol, 1,2-hexanediol, 1,3-butanediol, 1,5-pentanediol, and 1,6-hexanediol.

Beside having an effect as wetting agents, the above-mentioned glycol ethers and/or alkylene glycols also have characteristics as solvent auxiliaries. Specifically, when one of the above-mentioned acetylene glycols that has low solubility in water when used alone is used, the solubility of that acetylene glycol can be raised and the added amount thereof increased by using it along with a glycol ether.

Furthermore, since the above-mentioned glycol ethers and/or alkylene glycols also have a considerable action of killing and preventing fungus, the growth of microbes, fungi, and the like can be suppressed by adding these compounds to the dispersion and the ink. Therefore, the growth of these microbes can be suppressed without having to add a fungicide, anti-fungal agent, or the like by adding at least a specific amount of these compounds as a wetting agent in the dispersion step.

Specific examples of other wetting agents include methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 3-methyl-2-butanol, and neopentyl alcohol. Examples of nonionic surfactants include fluorine copolymers, silicone copolymers, acrylic copolymers, polyoxyethylene alkyl ethers, polyoxyethylene alkyl phenyl ethers, polyoxyethylene secondary alcohol ethers, polyoxyethylene sterol ethers, polyoxyethylene lauryl ethers, polyoxyethylene lanolin derivatives, oxyethylene derivatives of alkylphenol formalin condensates, polyoxyethylene polyoxypropylene block copolymers, polyoxyethylene polyoxypropylene alkyl ethers, polyethylene glycol fatty acid esters of condensed polyoxyethylene oxide type or of fatty acid ester of polyoxyethylene compound type, fatty acid monoglycerides, polyglycerin fatty acid esters, sorbitan fatty acid esters, propylene glycol fatty acid esters, sucrose fatty acid esters, fatty acid alkanolamides, polyoxyethylene fatty acid amides, polyoxyethylenealkylamines, and alkylamine oxides.

Specific examples of yet other wetting agents include water-soluble organic solvents such as ethylene glycol, diethylene glycol, triethylene glycol, propylene glycol, tetraethylene glycol, polyethylene glycol, dipropylene glycol, polypropylene glycol, hexylene glycol, thiodiglycol, glycerin, and 1,2,6-hexanetriol; alcohols such as 1-hexanol, 2-methyl-1-pentanol, 4-methyl-2-pentanol, 2-ethyl-1-butanol, 1-heptanol, 2-heptanol, 3-heptanol, 1-octanol, 2-octanol, 2-ethyl-1-hexanol, 1-nonanol, 3,5,5-trimethyl-1-hexanol, and 1-decanol; anionic surfactants such as higher fatty acid salts, higher alkyldicarboxylates, higher alcohol sulfates, higher alkylsulfonates, alkylbenzenesulfonates, alkylnaphthalenesulfonates, naphthalenesulfonic acid salt (Na, K, Li, Ca) formalin polycondensates, condensates of higher fatty acids and amino acids, dialkylsulfosuccinates, alkylsulfosuccinates, naphthenates, alkyl ether carboxylates, acylates peptides, α-olefin sulfonates, N-acylmethyltaurine, alkyl ether sulfates, secondary higher alcohol ethoxysulfates, polyoxyethylene alkyl phenyl ether sodium sulfates, polyoxyethylene alkyl phenyl ether ammonium sulfates, monoglysulfates, alkyl ether phosphates, and alkylphosphates; cationic surfactants such as aliphatic amine salts, quaternary ammonium salts, sulfonium salts, and phosphonium salts; amphoteric surfactants such as carboxybetaine types, aminocarboxylates, and lecithin; and sugars such as glucose, mannose, fructose, ribose, xylose, arabinose, lactose, galactose, maltitol, sorbitol, gluconolactone, and maltose. The above list is not intended to be comprehensive, however.

The above-mentioned wetting agents can be used singly or in combinations of two or more types in the method for manufacturing a pigment dispersion according to the present invention. There are no particular restrictions on the amount in which the wetting agent is added, as long as it is at least large enough for the addition to improve the dispersion efficiency, but not so large that it will hinder the practical use of the pigment dispersion or the dispersion state of the pigment, but a preferable added amount is 0.05 to 50 wt % with respect to the pigment dispersion in the dispersion step, with a range of 0.1 to 30 wt % being even better. The effect of the wetting agent will not be fully realized if the added amount is less than 0.05 wt %, but exceeding 50 wt % may destabilize the dispersion of the pigment particles.

The steps of the method for manufacturing a pigment dispersion according to the present invention will now be described.

The method for manufacturing the pigment dispersion of the present invention mainly comprises two steps: a "pigment surface-treating step" and a "surface-treated pigment dispersion step."

In the "pigment surface-treating step," the pigment is subjected to a surface treatment (the introduction of dispersibility-imparting groups) by mixing the pigment with a surface treatment agent in an aqueous or nonaqueous solvent, or by heating this mixture. After the surface treatment, the reaction product thus obtained is was hed with water and repeatedly subjected to ultrafiltration, reverse osmosis, centrifugation, and/or filtration or the like to remove any residual unreacted components, reaction by-products, residual treatment agent and so forth and to obtain a surface-treated pigment.

The pigment used in the surface-treating step is preferably first pulverized into fine particles before the hydrophilic dispersibility-imparting groups are introduced. The pulverization of the pigment can be accomplished by wet or dry pulverization using zirconia beads, glass beads, an inorganic salt, or another such pulverization medium. The pulverization apparatus can be an attriter, a ball mill, a vibratory mill, or the like, and after this pulverization it is preferable to remove any contaminants generated from the pulverization medium or the pulverization apparatus by washing, ultrafiltration, or the like. In particular, with a pulverization method that combines dry pulverization with an inorganic salt (salt milling), the contaminant generated from the pulverization medium is a water-soluble inorganic salt, and can therefore be easily removed by washing with water.

In the subsequent "surface-treated pigment dispersion step," the surface-treated pigment obtained in the "pigment surface-treating step," or a slurry, wet cake, or the like of the surface-treated pigment, is added along with a wetting agent and, if needed, a neutralizer or the like to an aqueous medium (particularly ion exchange water or distilled water), a suitable shear force is imparted with an agitator or a dispersing apparatus so as to disperse the pigment particles in the aqueous medium and obtain a self-dispersing pigment dispersion. The wetting agent should already be mixed with the pigment in at least the dispersion step, but the point at which it is added to the pigment may be either before or during the dispersion step.

It is also possible to conduct the above-mentioned "surface-treated pigment dispersion step" and the "pigment surface-treating step" continuously, and particularly when the surface treatment of the pigment is conducted in an aqueous solvent, the reaction solvent used in the surface treatment step can be the same aqueous system as the dispersion medium used in the dispersion step, which makes it easier to link continuous steps. Any residual unreacted components, reaction by-products, and so forth from the surface-treating step are best removed prior to the dispersion step, because this will ultimately make it easier to obtain a pigment dispersion with excellent dispersion stability. Meanwhile, it may in some cases be easier to separate out any residual unreacted components and so forth from the targeted surface-treated pigment if the solvent used in the surface treatment step is a nonaqueous solvent.

The method of the present invention for manufacturing a pigment dispersion will now be described in further detail by giving an example of a method for manufacturing a pigment dispersion having sulfur-containing dispersibility-imparting groups on its surface.

First, in the "pigment surface-treating step," a pigment in the form of fine particles or a powder is put in an aprotic solvent (such as N-methyl-2-pyrrolidone or sulfolane) used in an amount of 3 to 200 times the weight of the pigment, and the pigment particles are adjusted in size while being treated with a sulfonation agent. This sulfonation agent can be a sulfonated pyridine salt, sulfamic acid, amidosulfuric acid, fluorosulfuric acid, chlorosulfuric acid, sulfur trioxide, fuming sulfur, sulfuric acid, or the like, which can be used singly or in combinations of two or more types. The treatment with the sulfonation agent can be carried out under heating (approximately 60 to 200° C.) and agitation, and the heating can be performed before or after the addition of the sulfonation agent. After the sulfonation treatment, the aprotic solvent and any remaining sulfonation agent are removed from the pigment slurry thus obtained. This removal can be accomplished by repeated washing with water, ultrafiltration, reverse osmosis, centrifugation, and/or filtration or the like. Any contaminants admixed in the above-mentioned size adjustment and sulfonation treatment are removed along with the aprotic solvent and sulfonation agent.

Next, in the "surface-treated pigment dispersion step," the sulfonated pigment obtained in the above "pigment surface-treating step" is added along with the above-mentioned wetting agent and neutralizer to an aqueous medium (particularly ion exchange water or distilled water) such that the concentration is about 5 to 40 wt %, and dispersion is performed for a short time to obtain an aqueous dispersion of the pigment.

Examples of the apparatus that can be used for the dispersal include a stirrer, paint shaker, ball mill, sand mill, roll mill, speed line mill, homomixer, ultrasonic homogenizer, nanomizer, and microfluidizer.

The various wetting agents listed above can be used here, but examples of particularly favorable wetting agents include the above-mentioned acetylene glycols, acetylene alcohols, glycol ethers, and alkylene glycols.

The neutralizer is added for the purpose of dissociating the sulfur-containing dispersibility-imparting groups on the pigment surface. Specific examples include sodium hydroxide, lithium hydroxide, potassium hydroxide, ammonium hydroxide, triethanolamine, tripropanolamine, diethanolamine, monoethanolamine, and 2-amino-2-methyl-1-propanol.

The amount in which the dispersibility-imparting groups of the self-dispersing pigment are introduced in the present invention is preferably at least $10 \times 10^{-6}$ equivalents, and even more preferably at least $15 \times 10^{-6}$ equivalents, per gram of pigment particles. If the dispersibility-imparting group are introduced in an amount less than $5 \times 10^{-6}$ equivalents per gram of pigment particles, agglomeration of the dispersed pigment particles and other such problems will occur, leading to higher dispersion viscosity, to a larger diameter of the dispersed pigment particles and so forth, which decreases the stability of the pigment dispersion.

The amount in which the dispersibility-imparting groups are introduced can be measured as follows. In the case of sulfur-containing dispersibility-imparting groups, for instance, an aqueous pigment dispersion is treated by oxygen flask combustion method to effect absorption into a hydrogen peroxide aqueous solution, after which the sulfuric acid ions (divalent) are quantified by ion chromatography, and this result is converted for sulfonic acid groups and sulfine groups.

As to the zeta potential of the pigment dispersion in the present invention, it is preferable for the absolute value of the zeta potential of the pigment particles at 20° C. and a pH of 8 to 9 to be at least 30 mV when measured as a dilute system obtained by diluting the pigment dispersion with ion exchange water to a pigment concentration of 0.001 to 0.01 wt %. At least 40 mV is even better, and an absolute zeta potential of at least 50 mV is better yet. If the absolute zeta potential of the pigment particles in the pigment dispersion is less than 20 mV, there will be a drop in the storage stability of the pigment dispersion, just as when too few dispersibility-imparting groups are introduced.

It is preferable in the manufacturing method of the present invention for the surface tension of the pigment dispersion at least during the dispersion step to be 50 mN/m, with 40 mN/m being even better. If the surface tension during the dispersion step is over 60 mN/m, the dispersion treatment cannot be carried out efficiently, and a large quantity of contaminants, such as metal ions or fragments from the pigment particles, will be admixed into the dispersion. Usually, a pigment dispersion containing a surface-treated pigment has a higher surface tension, about the same as that of water (70 to 72 mN/m), and therefore a suitable wetting agent must be added as discussed above.

The average diameter of the self-dispersing pigment particles in the pigment dispersion produced by the manufacturing method of the present invention is preferably 10 to 300 nm. There may be a sharp drop in the light resistance of the pigment if the average particle diameter is less than 10 nm, but if 300 nm is exceeded, the effect resulting from settling becomes particularly pronounced, and the pigment will have a concentration distribution in the dispersion system. In terms of precipitation, it is preferable for the average diameter of the pigment particles to be no more than 200 nm, with 130 nm or less being even better, and the ideal pigment particle average diameter being 100 nm or less.

The pigment dispersion in the present invention, and an ink containing this pigment dispersion, will now be described. The ink of the present invention is characterized by containing at least a pigment dispersion manufactured by the manufacturing method of the present invention, and the content thereof, as the weight concentration of the surface-treated pigment, is preferably 0.5 to 30 wt %, with 1.0 to 12 wt % being better, and 2 to 10 wt % being best. The print density may be too low if the pigment content in the ink is less than 0.5 wt %, but if the amount is over 30 wt %, then the amount of humectant component added to the ink will be limited because of the ink viscosity, which may make the nozzles of an ink jet head more prone to clogging, or the ink viscosity may be so high that stable discharge is impossible.

The ink used in the present invention also contains a penetrant for the purpose of increasing the permeability of the ink into paper, which is the recording medium.

The penetrant may be the same as or different from the above-mentioned wetting agent added during dispersion. If a wetting agent is selected that increases contact between the pigment [particles] during dispersion and that enhances permeability into the recording paper, then this agent can serve both purposes. Also, when the ink is used for an ink jet printer, it is particularly favorable for there to be very little foaming and for the ink to be resistant to drying inside the nozzles of the ink jet head. When a wetting agent that satisfies all of these characteristics is used, there is no need to add a wetting agent and a penetrant separately, which is advantageous in terms of the ink properties, and especially its viscosity.

Examples of compounds that satisfy the characteristics required of the wetting agent and penetrant include the above-mentioned acetylene glycols, acetylene alcohols, glycol ethers, and alkylene glycols.

Specific examples of acetylene glycols and acetylene alcohols include the compounds expressed by the following Formulas I and III.

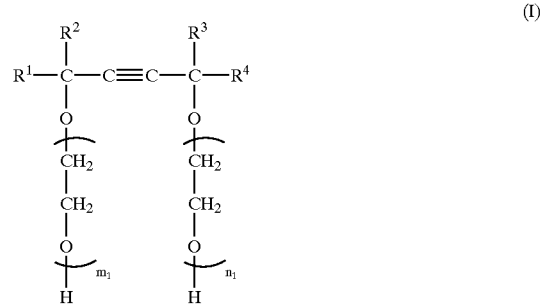

(Where $R^1$, $R^2$, $R^3$, and $R^4$ are each independently an alkyl group, asd $m_1+n_1$ is a number from 0 to 30.)

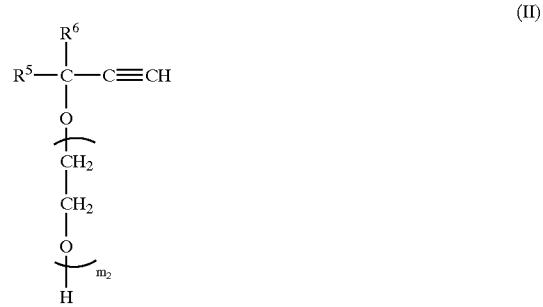

(Where $R^5$ and $R^6$ are each independently an alkyl group, and $m_2$ is a number from 0 to 30.)

Specific examples of product names include Surfynol TG, Surfynol 104, Surfynol 420, Surfynol 440, Surfynol 465, Surfynol 485, Surfynol 61, and Surfynol 82 (all made by Air Products), and Acetylenol EH, Acetylenol EL, and Acetylenol EO (all made by Kawaken Fine Chemicals).

Specific examples of glycol ethers include diethylene glycol mono-n-butyl ether, triethylene glycol mono-n-butyl ether, propylene glycol mono-n-butyl ether, and dipropylene glycol mono-n-butyl ether. The other glycol ethers previously listed can also be used.

These acetylene glycols, acetylene alcohols, glycol ethers, and alkylene glycols can be used singly or together as a penetrant in the ink of the present invention, and the amount added to the ink should be 0 to 30 wt %, and preferably 0.5 to 10 wt %. If the added amount is over 30 wt %, the area around the nozzles of the ink jet head will be unevenly wetted, making stable discharge difficult.

In addition, the alcohols, nonionic surfactants, water-soluble organic solvents, and other surfactants listed above can similarly be used as a penetrant for the ink of the present invention.

These penetrants can be used singly or in combinations of two or more types in the ink used in the present invention.

The above-mentioned and other surfactants, as well as high-boiling, low-volatility polyhydric alcohols, or monoethers, diethers, or esters of these, or other such hydrophilic, high-boiling, low-volatility solvents, or the like can be used, singly or in combinations of two or more types, as an auxiliary for the above-mentioned penetrant for the purpose of controlling the permeability of the ink and increasing the clog resistance of the nozzles, the moisture retention of the ink, or the solubility of the penetrant.

Examples of high-boiling, low-volatility polyhydric alcohols that can be used include glycerol, ethylene glycol, diethylene glycol, triethylene glycol, propylene glycol, dipropylene glycol, hexylene glycol, polyethylene glycol, polypropylene glycol, 1,5-pentanediol, and 1,2-hexanediol. Monoethers, diethers, esters, and so forth of these can also be used. It is also possible to use a hydrophilic, high-boiling, low-volatility solvent such as N-methyl-2-pyrrolidone, 2-pyrrolidone, 1,3-dimethylimidazolidinone, monoethanolamine, N,N-dimethylethanolamine, N,N-diethylethanolamine, diethanolamine, N-n-butyldiethanolamine, triisopropanolamine, triethanolamine, and other nitrogen-containing organic solvents.

The ink used in the present invention can also contain, in addition to the water serving as the main solvent, a small amount of ethanol, propanol, isopropanol, butanol, or other such highly volatile monohydric alcohol for the purpose of improving dryability.

A pH buffer can also be used in the ink of the present invention in order to adjust the ink to the optimal pH value. Examples of pH buffers include potassium hydrogenphthalate, potassium dihydrogenphosphate, sodium dihydrogenphosphate, sodium tetraborate, potassium hydrogentartrate, sodium hydrogencarbonate, sodium carbonate, tris(hydroxymethyl)aminomethane, and tris (hydroxymethyl)aminomethane hydrochloride. From the standpoint of the durability of the head members and the stability of the ink, the pH buffer should be contained in an amount such that the pH of the ink is about 7 to 10.

The pigment dispersion of the present invention, and the ink in which it is used, can also contain other additives as needed, such as mildew-proofing agents, preservatives, and rustproofing agents, including benzoic acid, dichlorophene, hexachlorophene, sorbic acid, p-hydroxybenzoic ester, ethylenediamine tetraacetic acid (EDTA), sodium dehydroacetate, 1,2-benzothiazolin-3-one (product name: Proxel XL II (made by ICI)), 3,4-isothiazolin-3-one, oxazoline compounds, alkyl isothiazolone, chloroalkyl isothiazolone, benzisoisothiazolone, bromonitroalcohol, and/or chloroxylenol. Further, urea, thiourea, and/or ethyleneurea or the like can be contained for the purpose of preventing drying in the nozzles.

The properties of the ink used in the present invention can be suitably controlled, and in a preferred mode, the viscosity of the ink is no more than 10 mPa·sec, with 5 mPa·sec or less (20° C.) being preferable. If the viscosity is within this range, the ink will be discharged stably from the ink discharge head. The surface tension of the ink can also be suitably controlled, and 25 to 50 mN/m (20° C.) is preferable, with 30 to 40 mN/m (20° C.) being even better.

OPERATION OF THE INVENTION

The inventors learned the following in the course of developing the pigment dispersion of the present invention and the method for manufacturing the same. The present invention is not, however, limited by the following inference.

As mentioned above, the ink jet printers of today offer higher image quality and speed, and it is difficult to ensure stable discharge characteristics, particularly with a pigment ink.

With a surface-treated pigment ink, it is believed that since there is no need to add a resin or the like as a dispersant, there are no discharge problems that would be caused by this resin, nor any decrease in storage stability due to the dispersed resin separating from the pigment, and therefore there are no discharge problems or any drop in storage stability. Nevertheless, even with a surface-treated pigment ink, when printing with an ink jet printer in which the smaller nozzle diameter necessitated by higher image quality and speed results in a higher head drive frequency, then the ink dots can be deflected, and when printing is resumed after the printer has not been used for an extended period, the pigment can clump together and clog the nozzles, leading to frequent discharge problems. The inventors succeeded at solving the above-mentioned discharge problems and problems such as the clumping of pigment by pre-adding a suitable wetting agent and conducting the dispersion treatment in a short time in the presence of this wetting agent in the step of dispersing a surface-treated pigment in an aqueous medium in the manufacture of a surface-treated self-dispersing pigment dispersion.

This effect is inferred as follows.

A surface-treated pigment has hydrophilic dispersibility-imparting groups introduced to the surface of fine pigment particles in a surface treatment step. In the surface-treating step, any by-products or residue that occur in the reaction must be washed away, and at this point the pigment is in a concentrated form such as a slurry, a wet cake, or a dry solid. Uniformly dispersing the surface-treated pigment particles in this concentrated state in an aqueous medium is what is involved in the subsequent dispersion step.

The "dispersion step" referred to here for a self-dispersing surface-treated pigment is different from the dispersion of a pigment that makes use of a conventional resin dispersant or the like. With a dispersion in which a pigment is dispersed by means of a conventional resin dispersant, the pigment and dispersant must be dispersed in water while being subjected to a high shear force in a dispersion apparatus. This dispersion must be such that the dispersant is adsorbed to the pigment surface and dispersed in the aqueous medium while the pigment clumps are broken up (that is, while the pigment particles are made smaller).

On the other hand, in the dispersion step for a self-dispersing surface-treated pigment, if an attempt is made to disperse the pigment particles by applying a high shear force at a high concentration, this can actually cause the pigment particles to clump together, resulting in a larger particle diameter. This is probably because when a high shear force is applied, the hydrophilic dispersion groups bonded to the pigment surface are physically stripped off, or the pigment particles are broken up into even smaller particles, revealing surfaces that have not been rendered hydrophilic. This agglomeration when a high shear force is applied has been found to be more pronounced in organic pigments than in carbon black pigments. Also, when a macromolecular substance is introduced (bonded) to the pigment surface, there is the possibility that it will be physically stripped from the pigment surface more than the dispersion groups because the molecular weight of this substance is higher than that of the hydrophilic dispersibility-imparting groups.

The inventors tried dispersing pigment particles more slowly, without applying a shear force strong enough to break up the particles, and found that it takes a long time (at least 10 hours) to disperse the pigment if the dispersion treatment is performed until fine particles (about 100 nm) are obtained. When a dispersion treatment was thus performed over a longer period under gentler shear conditions, there was no pigment clumping or increase in particle diameter due to the breaking up of the pigment particles, but instead a large quantity of contaminants (ions of silicon, iron, nickel, chromium, and so forth) generated by the dispersion medium or the like ended up being admixed, and this had an adverse effect on ink discharge and on the long-term storage stability of the ink. For example, it wa s confirmed that when glass beads are used, the silicon that is the main component of the beads wears down and dissolves in the ink, but if an ink in which silicon is dissolved is used in an ink jet printer, the dissolved silicon solidifies and adheres around the nozzles, resulting in deflection and poor discharge. Meanwhile, if a hard substance such as zirconia beads is used as the dispersion medium in an effort to prevent this wear of the medium, then the inner walls (made of stainless steel, for instance) of the dispersion apparatus will wear, and the iron, nickel, chromium, and other components thereof will be admixed into the ink, which again results in poor discharge and a change in the ink properties over long-term storage.

The reason why poor discharge, and particularly a loss of storage stability, is caused by metal ions and other contaminants admixed into an ink is not fully understood, but judging from the fact that dispersion stability is preserved by the electrical repellency of the dispersion groups that a surface-treated pigment has on its surface, it might be that the effect of metal ions results in a loss of this electrical repellency, causing the pigment to clump.

Therefore, in order to solve these problems of pigment clumping and increased particle size, or poor discharge and decreased storage stability, it seems necessary to perform the dispersion treatment under a gentle shear force, and furthermore to shorten as much as possible the time this treatment takes.

The inventors succeeded at greatly shortening the dispersion treatment time (to about one-tenth) by adding a suitable wetting agent. As a result, they succeeded in manufacturing a pigment ink for an ink jet printer, which ensures both stable printing characteristics in a modern ink jet printer having a head that is driven at a high frequency and a small nozzle diameter for the sake of higher image quality and speed, as well as storage stability that keeps the properties of the ink from changing.

The acetylene glycols and acetylene alcohols expressed by the following Formulas I and II are extremely effective as this wetting agent.

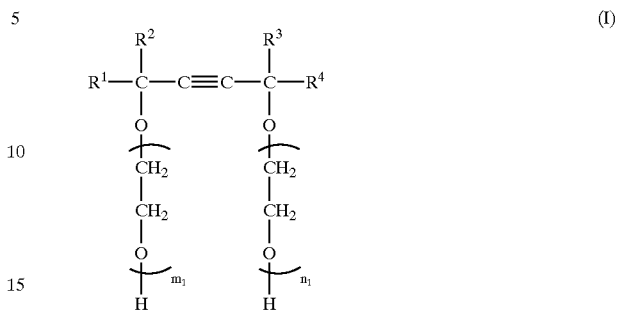

(I)

(Where $R^1$, $R^2$, $R^3$, and $R^4$ are each independently an alkyl group, and $m_1+n_1$ is a number from 0 to 30.)

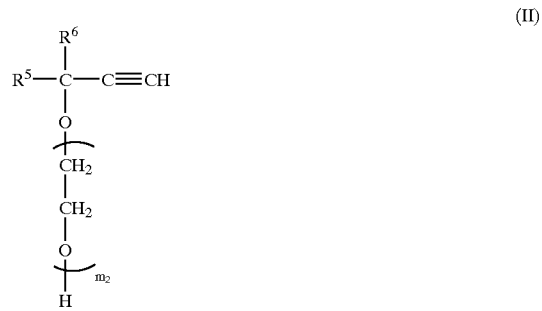

(II)

(Where $R^5$ and $R^6$ are each independently an alkyl group, and $m_2$ is a number from 0 to 30.)

These acetylene glycols and acetylene alcohol are also highly effective as penetrants for the ink. Because a characteristic of these compounds is that they suppress foaming, they are effective as a wetting agent and penetrant during dispersion from this standpoint as well. They are also favorable as a wetting agent and a penetrant in that substances with the characteristics of each do not have to be added separately, which keeps the ink viscosity low.

EXAMPLES

The present invention will now be described in specific terms through examples, but the scope of the present invention is not limited by these examples. In the description of the examples, a self-dispersing surface-treated pigment in which hydrophilic dispersibility-imparting groups have been chemically bonded to the pigment particle surface directly and/or via polyvalent groups so as to makes dispersion in water possible will be simply referred to as a surface-treated pigment. In the examples and comparative examples that follow, all parts and percentages are by weight unless otherwise specified.

The properties (surface tension and average particle diameter) of the pigment dispersions obtained in Examples 1 to 17 and Comparative Examples 1 to 4 were measured by the following methods.

Measurement of Surface Tension

The surface tension (20° C.) of the pigment dispersions obtained in the examples and comparative examples was measured with a surface tension gauge (CBVP-A3 made by Kyowa Kaimen Kagaku).

Measurement of Average Particle Diameter

The pigment dispersions obtained in the examples and comparative examples were diluted with ion exchange water such that the pigment concentration would be 0.001 to 0.01 wt %, and the average particle diameter of the dispersed particles at 20° C. was measured with a particle size distribution gauge (ELS-800 made by Otsuka Electronics).

Example 1

(1) Production of Surface-treated Pigment: Carbon Black (Surface-treating Step)

20 parts carbon black ("MA-100" made by Mitsubishi Chemical) was mixed into 250 parts sulfolane, and grading dispersion was performed for 1 hour in an Eiger Motor Mill model M250 (made by Eiger Japan) at a bead packing level of 70% and a speed of 5000 rpm. The mixture of graded pigment paste and solvent was transferred to an evaporator, where it was heated to 120° C. under a reduced pressure of 30 mmHg or less, distilling off as much of the water contained in the system as possible, after which the temperature was adjusted to 150° C. 25 parts sulfur trioxide was then added and allowed to react for 6 hours, and upon completion of the reaction the product was washed several times with an excess of sulfolane and then poured into water and filtered, which yielded a slurry of a surface-treated carbon black pigment in which sulfur-containing dispersibility-imparting groups such as sulfinic acid ($SO_2^-$) groups or sulfonic acid ($SO_3^-$) groups were directly introduced to the pigment surface.

(2) Production of Pigment Dispersion (Dispersion Treatment Step)

1.5 parts Surfynol 485 (made by Air Products) as a wetting agent, 2 parts diethanolamine as a neutralizer, and 81.5 parts ion exchange water were added to 15 parts of the surface-treated carbon black obtained in Example 1 (1), and the components were dispersed with a paint shaker (using glass beads, at a bead packing level of 60% and a medium diameter of 1.7 mm) until the average particle diameter of the pigment (the secondary particle diameter) was 100 nm, which yielded a surface-treated carbon black pigment dispersion in which sulfur-containing dispersibility-imparting groups were introduced (surface tension: 33 mN/m).

(3) Preparation of Ink Jet Recording Ink 10 parts diethylene glycol mono-n-butyl ether, 15 parts glycerin, and 35 parts ion exchange water were gradually added under agitation to 40 parts of the surface-treated carbon black pigment dispersion obtained in Example 1 (2), which yielded the ink of Example 1 of the present invention.

The ink composition was as follows.

| | |
|---|---|
| surface-treated carbon black pigment | 6.0% |
| Surfynol 485 | 0.6% |
| diethylene glycol mono-n-butyl ether | 10.0% |
| glycerin | 15.0% |
| diethanolamine | 0.8% |
| ion exchange water | remainder |

(The surface-treated carbon black pigment, Surfynol 485, diethanolamine, and ion exchange water in the ink composition include the portions added as the surface-treated carbon black pigment.)

(4) Quantification of Ions

The pigment dispersion in Example 1 (2) was measured out in the required amount and centrifuged in a centrifugal ultrafiltration apparatus (C-15, made by Millipore). A type NMWL10000 was used as the filter, and the centrifuging conditions comprised 2500 G for 60 minutes. 10 mg of the filtrate thus obtained was treated by oxygen flask combustion method, after which it was absorbed into a 0.2% nitric acid aqueous solution. This product was then quantified by ion chromatography (ionPac AS12A column; DX-500 made by Nippon Dionex), which revealed the amounts of silicon, calcium, magnesium, iron, chromium, and nickel ions to be 50 ppm, 32 ppm, 20 ppm, 45 ppm, 33 ppm, and 15 ppm, respectively, each of which was below 100 ppm. The total amount of polyvalent metal ions was approximately 200 ppm, which was below 600 ppm.

(5) Printing Test

Using an EM-900C ink jet recording printer made by Seiko Epson and the ink prepared in Example 1 (3), a printing test was conducted on different types of paper, namely, Xerox P (made by Fuji Xerox) as neutral ordinary paper, EPP (made by Seiko Epson) as acidic ordinary paper, and Xerox R (made by Fuji Xerox) as recycled paper.

There was almost no irregular bleeding with any of the obtained printed images, and the printed images were of extremely good quality and high print density.

Also, throughout the printing test there were no missing dots or deflection, and the printing was extremely stable. The power source of the printer was then left off and the same test was conducted a week later, whereupon printing started as soon as the print signal was transmitted to the printer, and no ink discharge problems such as nozzle clogging were noted.

(6) Ink Storage Stability Test

The ink prepared in Example 1 (3) was put in a glass sample bottle and allowed to stand for 1 week at 60° C. and for 1 week at −20° C., and the ink was checked for precipitation and for solid bits before and after being allowed to stand.

In the evaluation of the solid bits, the ink was filtered with a 5 μm crisscrossed filter, after which the amount of the solid bits remaining on the filter was observed under a microscope. Precipitation was checked visually by looking at the bottom of the sample bottle.

There was no the solid bits and no precipitation occurred before or after standing under either set of conditions, indicating that the storage stability was extremely good.

Example 2

(1) Production of Surface-treated Pigment: C.I. Pigment Blue 15:3

(Surface-treating Step)

15 parts phthalocyanine blue pigment (C.I. Pigment Blue 15:3) was mixed with 450 parts quinoline, and grading dispersion was performed for 2 hours in an Eiger Motor Mill model M250 (made by Eiger Japan) at a bead packing level of 70% and a speed of 5000 rpm. The mixture of graded pigment paste and solvent was transferred to an evaporator, where it was heated to 120° C. under a reduced pressure of 30 mmHg or less, distilling off as much of the water contained in the system as possible, after which the temperature was adjusted to 160° C. 20 parts sulfonated pyridine complex was then added and allowed to react for 8 hours, and upon completion of the reaction the product was washed several times with an excess of quinoline and then poured into water and filtered, which yielded a slurry of a surface-treated phthalocyanine blue pigment in which sulfur-containing dispersibility-imparting groups such as sulfinic acid ($SO_2^-$) groups or sulfonic acid ($SO_3^-$) groups were directly introduced to the pigment surface.

(2) Production of Pigment Dispersion
(Dispersion Treatment Step)

2 parts Surfynol 465 (made by Air Products) as a wetting agent, 3 parts triethanolamine as a neutralizer, and 85 parts ion exchange water were added to 10 parts of the surface-treated phthalocyanine blue pigment obtained in Example 2 (1), and the components were dispersed with a paint shaker (using glass beads, at a bead packing level of 60% and a medium diameter of 1.7 mm) until the average particle diameter of the pigment (the secondary particle diameter) was 95 nm, which yielded a surface-treated phthalocyanine pigment dispersion in which sulfur-containing dispersibility-imparting groups were introduced (surface tension: 32 mN/m). Dispersion time was about one hour.

(3) Preparation of Ink Jet Recording Ink 15 parts triethylene glycol mono-n-butyl ether, 15 parts glycerin, and 30 parts ion exchange water were gradually added under agitation to 50 parts of the surface-treated phthalocyanine blue pigment dispersion obtained in Example 2 (2), which yielded the ink of Example 2 of the present invention.

The ink composition was as follows.

| | |
|---|---|
| surface-treated phthalocyanine blue pigment | 5.0% |
| Surfynol 465 | 1.0% |
| triethylene glycol mono-n-butyl ether | 5.0% |
| glycerin | 15.0% |
| triethanolamine | 1.0% |
| ion exchange water | remainder |

(The surface-treated phthalocyanine blue pigment, Surfynol 465, triethanolamine, and ion exchange water in the ink composition include the portions added as the surface-treated phthalocyanine blue pigment.)

(4) Quantification of Ions

The pigment dispersion in Example 2 (2) was measured out in the required amount and quantified by the same method as that described in Example 1 (4), which revealed the amounts of silicon, calcium, magnesium, iron, chromium, and nickel ions to be 65 ppm, 15 ppm, 20 ppm, 25 ppm, 18 ppm, and 16 ppm, respectively, each of which was below 100 ppm. The total amount of polyvalent metal ions was approximately 160 ppm, which was below 600 ppm.

(5) Printing Test

Using the ink prepared in Example 2 (3), a printing test was conducted by the same method as that described in Example 1 (5).

There was almost no irregular bleeding with any of the obtained printed images, and the printed images were of extremely good quality and high print density. Also, the dryability of the solid printed portion was extremely good.

Also, throughout the printing test there were no missing dots or deflection, and the printing was extremely stable. The power source of the printer was then left off and the same test was conducted a week later, whereupon printing started as soon as the print signal was transmitted to the printer, and no ink discharge problems such as nozzle clogging were noted.

(6) Ink Storage Stability Test

The ink prepared in Example 2 (3) was put in a glass sample bottle and tested for storage stability by the same method as that described in Example 1 (5).

There was no solid bits and no precipitation occurred before or after standing under either set of conditions, indicating that the storage stability was good.

Example 3

(1) Production of Surface-treated Pigment: C.I. Pigment Yellow 110

20 parts isoindolinone yellow pigment (C.I. Pigment Yellow 110) that had been pulverized into fine particles was mixed with 500 parts quinoline, and these were thoroughly agitated and mixed with a magnetic stirrer. The mixture of pigment paste and solvent was transferred to an evaporator, where it was heated to 120° C. under a reduced pressure of 30 mmHg or less, distilling off as much of the water contained in the system as possible, after which the temperature was adjusted to 160° C. 20 parts sulfonated pyridine complex was then added as a reaction agent and allowed to react for 4 hours, and upon completion of the reaction the product was washed several times with an excess of quinoline and then poured into water and filtered, which yielded a slurry of a surface-treated isoindolinone yellow pigment in which sulfur-containing dispersibility-imparting groups such as sulfinic acid ($SO_2^-$) groups or sulfonic acid ($SO_3^-$) groups were directly introduced to the pigment surface.

(2) Production of Pigment Dispersion
(Dispersion Treatment Step)

2 parts Surfynol 485 (made by Air Products), 0.5 part Surfynol 104 (made by Air Products), and 5 parts diethylene glycol mono-n-butyl ether as wetting agents, 3 parts tripropanolamine as a neutralizer, and 54.5 parts ion exchange water were added to 40 parts of the surface-treated isoindolinone yellow pigment obtained in Example 3 (1), and the components were dispersed with a paint shaker (using zirconia beads, at a bead packing level of 60% and a medium diameter of 1.7 mm) until the average particle diameter of the pigment (the secondary particle diameter) was 90 nm, which yielded a surface-treated isoindolinone yellow pigment dispersion in which sulfur-containing dispersibility-imparting groups were introduced (surface tension: 30 mN/m). The dispersion time was approximately 1 hour.

(3) Preparation of Ink Jet Recording Ink 5 parts glycerin and 65 parts ion exchange water were gradually added under agitation to 20 parts of the surface-treated isoindolinone yellow pigment dispersion obtained in Example 3 (2), which yielded the ink of Example 3 of the present invention.

The ink composition was as follows.

| | |
|---|---|
| surface-treated isoindolinone yellow pigment | 8.0% |
| Surfynol 485 | 0.4% |
| Surfynol 104 | 0.1% |
| diethylene glycol mono-n-butyl ether | 1.0% |

-continued

| | |
|---|---|
| glycerin | 15.0% |
| tripropanolamine | 0.6% |
| ion exchange water | remainder |

(The surface-treated isoindolinone yellow pigment, Surfynol 485, Surfynol 104, diethylene glycol mono-n-butyl ether, tripropanolamine, and ion exchange water in the ink composition include the portions added as the surface-treated isoindolinone yellow pigment.)

(4) Quantification of Ions

The pigment dispersion in Example 3 (2) was measured out in the required amount and quantified by the same method as that described in Example 1 (4), which revealed the amounts of silicon, calcium, magnesium, iron, chromium, and nickel ions to be 35 ppm, 20 ppm, 50 ppm, 92 ppm, 75 ppm, and 40 ppm, respectively, each of which was below 100 ppm. The total amount of polyvalent metal ions was approximately 330 ppm, which was below 600 ppm.

(5) Printing Test

Using the ink prepared in Example 3 (3), a printing test was conducted by the same method as that described in Example 1 (5).

There was almost no irregular bleeding with any of the obtained printed images, and the printed images were of extremely good quality and high print density. Also, the dryability of the solid printed portion was extremely good.

Also, throughout the printing test there were no missing dots or deflection, and the printing was extremely stable. The power source of the printer was then left off and the same test was conducted a week later, whereupon printing started as soon as the print signal was transmitted to the printer, and no ink discharge problems such as nozzle clogging were noted.

(6) Ink Storage Stability Test

The ink prepared in Example 3 (3) was put in a glass sample bottle and tested for storage stability by the same method as that described in Example 1 (5).

There was no solid bits and no precipitation occurred before or after standing under either set of conditions, indicating that the storage stability was good.

Example 4

(1) Production of Surface-treated Pigment: C.I. Pigment Red 122

20 parts dimethylquinacridone pigment (C.I. Pigment Red 122) was mixed with 500 parts quinoline, and grading dispersion was performed for 2 hours in an Eiger Motor Mill model M250 (made by Eiger Japan) at a bead packing level of 70% and a speed of 5000 rpm. The mixture of graded pigment paste and solvent was transferred to an evaporator, where it was heated to 120° C. under a reduced pressure of 30 mmHg or less, distilling off as much of the water contained in the system as possible, after which the temperature was adjusted to 160° C. 20 parts sulfonated pyridine complex was then added as a reaction agent and allowed to react for 4 hours, and upon completion of the reaction the product was washed several times with an excess of quinoline and then poured into water and filtered, which yielded a slurry of a surface-treated quinacridone pigment in which sulfur-containing dispersibility-imparting groups such as sulfinic acid ($SO_2^-$) groups or sulfonic acid ($SO_3^-$) groups were directly introduced to the pigment surface.

(2) Production of Pigment Dispersion (Dispersion Treatment Step)

3 parts Acetylenol EH (made by Kawaken Fine Chemicals) and 20 parts triethylene glycol mono-n-butyl ether as wetting agents, 2 parts propanolamine as a neutralizer, and 60 parts ion exchange water were added to 15 parts of the surface-treated dimethylquinacridone pigment obtained in Example 4 (1), and the components were dispersed with a paint shaker (using glass beads, at a bead packing level of 60% and a medium diameter of 1.7 mm) until the average particle diameter of the pigment (the secondary particle diameter) was 100 nm, which yielded a surface-treated dimethylquinacridone pigment dispersion in which sulfur-containing dispersibility-imparting groups were introduced (surface tension: 30 mN/m). The dispersion time was approximately 1 hour.

(3) Preparation of Ink Jet Recording Ink 0.3 part Acetylenol EH (made by Kawaken Fine Chemicals), 15 parts glycerin, and 54.7 parts ion exchange water were gradually added under agitation to 30 parts of the surface-treated dimethylquinacridone pigment dispersion obtained in Example 4 (2), which yielded the ink of Example 4 of the present invention.

The ink composition was as follows.

| | |
|---|---|
| surface-treated dimethylquinacridone pigment | 4.5% |
| Acetylenol EH | 1.2% |
| triethylene glycol mono-n-butyl ether | 6.0% |
| glycerin | 15.0% |
| propanolamine | 0.6% |
| ion exchange water | remainder |

(The surface-treated dimethylquinacridone pigment, Acetylenol EH, triethylene glycol mono-n-butyl ether, propanolamine, and ion exchange water in the ink composition include the portions added as the surface-treated dimethylquinacridone pigment.)

(4) Quantification of Ions

The pigment dispersion in Example 4 (2) was measured out in the required amount and quantified by the same method as that described in Example 1 (4), which revealed the amounts of silicon, calcium, magnesium, iron, chromium, and nickel ions to be 95 ppm, 75 ppm, 50 ppm, 53 ppm, 43 ppm, and 23 ppm, respectively, each of which was below 100 ppm. The total amount of polyvalent metal ions was approximately 350 ppm, which was below 600 ppm.

(5) Printing Test

Using the ink prepared in Example 4 (3), a printing test was conducted by the same method as that described in Example 1 (5).

There was almost no irregular bleeding with any of the obtained printed images, and the printed images were of extremely good quality and high print density. Also, the dryability of the solid printed portion was extremely good.

Also, throughout the printing test there were no missing dots or deflection, and the printing was extremely stable. The power source of the printer was then left off and the same test was conducted a week later, whereupon printing started as soon as the print signal was transmitted to the printer, and no ink discharge problems such as nozzle clogging were noted.

(6) Ink Storage Stability Test

The ink prepared in Example 4 (3) was put in a glass sample bottle and tested for storage stability by the same method as that described in Example 1 (5).

There was no solid bits and no precipitation occurred before or after standing under either set of conditions, indicating that the storage stability was good.

Example 5

(1) Production of Surface-treated Pigment: C.I. Pigment Violet 19

20 parts quinacridone pigment (C.I. Pigment Violet 19) that had been pulverized into fine particles was mixed with 500 parts quinoline, and these were thoroughly agitated and mixed with a magnetic stirrer. The mixture of pigment paste and solvent was transferred to an evaporator, where it was heated to 120° C. under a reduced pressure of 30 mmHg or less, distilling off as much of the water contained in the system as possible, after which the temperature was adjusted to 160° C. 20 parts sulfonated pyridine complex was then added and allowed to react for 8 hours, and upon completion of the reaction the product was washed several times with an excess of quinoline and then poured into water and filtered, which yielded a slurry of a surface-treated quinacridone pigment in which sulfur-containing dispersibility-imparting groups such as sulfinic acid ($SO_2^-$) groups or sulfonic acid ($SO_3^-$) groups were directly introduced to the pigment surface.

(2) Production of Pigment Dispersion (Dispersion Treatment Step)

3 parts Surfynol 420 (made by Air Products) and 5 parts 1,2-hexanediol as wetting agents, 2 parts propanolamine as a neutralizer, 5 parts 2-pyrrolidone as a dissolution auxiliary for the Surfynol 420, and 75 parts ion exchange water were added to 10 parts of the surface-treated quinacridone pigment obtained in Example 5 (1), and the components were dispersed with a paint shaker (using glass beads, at a bead packing level of 60% and a medium diameter of 1.7 mm) until the average particle diameter of the pigment (the secondary particle diameter) was 95 nm, which yielded a surface-treated quinacridone pigment dispersion in which sulfur-containing dispersibility-imparting groups were introduced (surface tension: 31 mN/m). The dispersion time was approximately 1 hour.

(3) Preparation of Ink Jet Recording Ink 0.4 part Surfynol 420 (made by Air Products), 1.4 parts 1,2-hexanediol, 3 parts triethylene glycol mono-n-butyl ether, 10 parts glycerin, 5 parts triethylene glycol, and 60.2 parts ion exchange water were gradually added under agitation to 20 parts of the surface-treated quinacridone pigment dispersion obtained in Example 5 (2), which yielded the ink of Example 5 of the present invention.

The ink composition was as follows.

| | |
|---|---|
| surface-treated quinacridone pigment | 2.0% |
| Surfynol 420 | 1.0% |
| 1,2-hexanediol | 2.4% |
| 2-pyrrolidone | 1.0% |
| triethylene glycol mono-n-butyl ether | 3.0% |
| glycerin | 10.0% |
| triethylene glycol | 5.0% |
| propanolamine | 0.4% |
| ion exchange water | remainder |

(The surface-treated quinacridone pigment, Surfynol 420, 1,2-hexanediol, 2-pyrrolidone, propanolamine, and ion exchange water in the ink composition include the portions added as the surface-treated quinacridone pigment.) (4) Quantification of Ions The pigment dispersion in Example 5 (2) was measured out in the required amount and quantified by the same method as that described in Example 1 (4), which revealed the amounts of silicon, calcium, magnesium, iron, chromium, and nickel ions to be 65 ppm, 15 ppm, 43 ppm, 25 ppm, 18 ppm, and 16 ppm, respectively, each of which was below loo ppm. The total amount of polyvalent metal ions was approximately 190 ppm, which was below 600 ppm.

(5) Printing Test

Using the ink prepared in Example 5 (3), a printing test was conducted by the same method as that described in Example 1 (5).

There was almost no irregular bleeding with any of the obtained printed images, and the printed images were of extremely good quality and high print density. Also, the dryability of the solid printed portion was extremely good.

Also, throughout the printing test there were no missing dots or deflection, and the printing was extremely stable. The power source of the printer was then left off and the same test was conducted a week later, whereupon printing started as soon as the print signal was transmitted to the printer, and no ink discharge problems such as nozzle clogging were noted.

(6) Ink Storage Stability Test

The ink prepared in Example 5 (3) was put in a glass sample bottle and tested for storage stability by the same method as that described in Example 1 (5).

There was no solid bits and no precipitation occurred before or after standing under either set of conditions, indicating that the storage stability was good.

Example 6

(1) Production of Surface-treated Pigment: C.I. Pigment Yellow 128

20 parts condensed azo yellow pigment (C.I. Pigment Red 128) was mixed with 500 parts quinoline, and grading dispersion was performed for 2 hours in an Eiger Motor Mill model M250 (made by Eiger Japan) at a bead packing level of 70% and a speed of 5000 rpm. The mixture of graded pigment paste and solvent was transferred to an evaporator, where it was heated to 120° C. under a reduced pressure of 30 mmHg or less, distilling off as much of the water contained in th e system as possible, after which the temperature was adjusted to 160° C. 20 parts sulfonated pyridine complex was then added as a reaction agent and a llowed to react for 4 hours, and upon completion of the reaction the product was washed several times with an excess of quinoline and then poured into water and filtered, which yielded a slurry of a surface-treated condensed azo yellow pigment in which sulfur-containing dispersibility-imparting groups such as sulfinic acid ($SO_2^-$) groups or sulfonic acidine groups were directly introduced to the pigment surface.

(2) Production of Pigment Dispersion (Dispersion Treatment Step)

0.1 part Acetylenol EQ (made by Kawaken Fine Chemicals) and 10 parts diethylene glycol mono-n-butyl ether as wetting agents, 0.5 part sodium hydroxide as a neutralizer, and 84.4 parts ion exchange water were added to 5 parts of the surface-treated condensed azo yellow pigment obtained in Example 6 (1), and the components were dispersed with a paint shaker (using glass beads, at a bead packing level of 60% and a medium diameter of 1.7 mm) until the average particle diameter of the pigment (the secondary particle diameter) was 110 nm, which yielded a surface-treated condensed azo yellow pigment dispersion in which sulfur-containing dispersibility-imparting groups were introduced (surface tension: 39 mN/m). The dispersion time was approximately 3 hours.

(3) Preparation of Ink Jet Recording Ink 0.5 part Acetylenol EH (made by Kawaken Fine Chemicals), 5 parts glycerin, 10 parts tetraethylene glycol, 0.9 part triethanolamine, and 23.6 parts ion exchange water were gradually added under agitation to 60 parts of the surface-treated condensed azo yellow pigment dispersion obtained in Example 6 (2), which yielded the ink of Example 6 of the present invention.

The ink composition was as follows.

| | |
|---|---|
| surface-treated condensed azo yellow pigment | 3.0% |
| Acetylenol EO | 0.06% |
| Acetylenol EH | 0.5% |
| diethylene glycol mono-n-butyl ether | 6.0% |
| glycerin | 5.0% |
| tetraethylene glycol | 10.0% |
| sodium hydroxide | 0.5% |
| triethanolamine | 0.9% |
| ion exchange water | remainder |

(The surface-treated condensed azo yellow pigment, Acetylenol EO, diethylene glycol mono-n-butyl ether, sodium hydroxide, and ion exchange water in the ink composition include the portions added as the surface-treated condensed azo yellow pigment.)

(4) Quantification of Ions

The pigment dispersion in Example 6 (2) was measured out in the required amount and quantified by the same method as that described in Example 1 (4), which revealed the amounts of silicon, calcium, magnesium, iron, chromium, and nickel ions to be 95 ppm, 85 ppm, 80 ppm, 53 ppm, 43 ppm, and 23 ppm, respectively, each of which was below 100 ppm. The total amount of polyvalent metal ions was approximately 390 ppm, which was below 600 ppm.

(5) Printing Test

Using the ink prepared in Example 6 (3), a printing test was conducted by the same method as that described in Example 1 (5).

There was almost no irregular bleeding with any of the obtained printed images, and the printed images were of extremely good quality and high print density. Also, the dryability of the solid printed portion was extremely good.

Also, throughout the printing test there were no missing dots or deflection, and the printing was extremely stable. The power source of the printer was then left off and the same test was conducted a week later, whereupon there were some missing dots in the first printing when the print signal was transmitted to the printer, but this was quickly remedied by cleaning, and posed no practical problem whatsoever.

(6) Ink Storage Stability Test

The ink prepared in Example 6 (3) was put in a glass sample bottle and tested for storage stability by the same method as that described in Example 1 (5).

A minute amount of solid bits was seen when the ink was left at high temperature, but this was not serious enough to pose a practical problem. No precipitation occurred, indicating that the storage stability was good.

Example 7

(1) Production of Surface-treated Pigment: Carbon Black (Surface-treating Step)

25 parts carbon black pigment ("Special Black 4" made by Degussa) was mixed into 250 parts sulfolane, and grading dispersion was performed for 1 hour in an Eiger Motor Mill model M250 (made by Eiger Japan) at a bead packing level of 70% and a speed of 5000 rpm. The mixture of graded pigment paste and solvent was transferred to an evaporator, where it was heated to 120° C. under a reduced pressure of 30 mmHg or less, distilling off as much of the water contained in the system as possible, after which the temperature was adjusted to 150° C. 25 parts sulfur trioxide was then added and allowed to react for 6 hours, and upon completion of the reaction the product was washed several times with an excess of sulfolane and then poured into water and filtered, which yielded a slurry of a surface-treated carbon black pigment in which sulfur-containing dispersibility-imparting groups such as sulfinic acid ($SO_2^-$) groups or sulfonic acid ($SO_3^-$) groups were directly introduced to the pigment surface.

In this example, polyethylene glycol (MW=5000) was further introduced as a macromolecular substance to the above-mentioned surface-treated carbon black pigment.

5 parts ethyl p-aminobenzoate and 3 parts concentrated nitric acid were added to 400 parts water and cooled to 5° C. under agitation. The above-mentioned surface-treated carbon black pigment was added to this suspension, an aqueous solution composed of 50 parts water and 2 parts sodium nitrite was slowly added and the'system was agitated for 10 hours, and this product was repeatedly washed with water and filtered, which yielded a slurry of a surface-treated carbon black pigment in which ethyl carboxylate groups were introduced via phenyl groups.

Next, 40 parts polyethylene glycol (MW=5000) and 0.5 part diazabicycloundecene (DBU) were dissolved in 200 parts ethanol, and the surface-treated carbon black pigment synthesized above was gradually added and the system agitated. The pH of the mixture was adjusted to 10, and the system was refluxed for 24 hours, after which the mixture thus obtained was repeatedly washed with ethanol and filtered, which ultimately yielded a surface-treated carbon black pigment in which sulfur-containing dispersibility-imparting groups were directly introduced to the surface, and polyethylene oxide propylene oxide benzamide was introduced via phenyl groups.

(2) Production of Pigment Dispersion
(Dispersion Treatment Step)

2 parts Surfynol 465 (made by Air Products) as a wetting agent, 2 parts diethanolamine as a neutralizer, and 66 parts ion exchange water were added to 30 parts of the surface-treated carbon black obtained in Example 7 (1), and the components were dispersed with a paint shaker (using glass beads, at a bead packing level of 60% and a medium diameter of 1.7 mm) until the average particle diameter of the pigment (the secondary particle diameter) was 100 nm, which yielded a surface-treated carbon black pigment dispersion in which sulfur-containing dispersibility-imparting groups were introduced (surface tension: 30 mN/m). The dispersion time was approximately 1 hour.

(3) Preparation of Ink Jet Recording Ink 10 parts diethylene glycol mono-n-butyl ether, 15 parts glycerin, and 55 parts ion exchange water were gradually added under agitation to 20 parts of the surface-treated carbon black pigment dispersion obtained in Example 7 (2), which yielded the ink of Example 7 of the present invention.

The ink composition was as follows.

| | |
|---|---|
| surface-treated carbon black pigment | 6.0% |
| Surfynol 465 | 0.4% |
| diethylene glycol mono-n-butyl ether | 10.0% |
| glycerin | 15.0% |
| diethanolamine | 0.4% |
| ion exchange water | remainder |

(The surface-treated carbon black pigment, Surfynol 465, diethanolamine, and ion exchange water in the ink composition include the portions added as the surface-treated carbon black pigment.)

(4) Quantification of Ions

The pigment dispersion in Example 7 (2) was measured out in the required amount and quantified by the same method as that described in Example 1 (4), which revealed the amounts of silicon, calcium, magnesium, iron, chromium, and nickel ions to be 50 ppm, 32 ppm, 20 ppm, 45 ppm, 33 ppm, and 15 ppm, respectively, each of which was below 100 ppm. The total amount of polyvalent metal ions was approximately 200 ppm, which was below 600 ppm.

(5) Printing Test

Using the ink prepared in Example 7 (3), a printing test was conducted by the same method as that described in Example 1 (5).

There was almost no irregular bleeding with any of the obtained printed images, and the printed images were of extremely good quality and high print density. Also, the dryability of the solid printed portion was extremely good.

Also, throughout the printing test there were no missing dots or deflection, and the printing was extremely stable. The power source of the printer was then left off and the same test was conducted a week later, whereupon printing started as soon as the print signal was transmitted to the printer, and no ink discharge problems such as nozzle clogging were noted.

(6) Ink Storage Stability Test

The ink prepared in Example 7 (3) was put in a glass sample bottle and tested for storage stability by the same method as that described in Example 1 (5).

There was no solid bits and no precipitation occurred before or after standing under either set of conditions, indicating that the storage stability was good.

Example 8

(1) Production of Surface-treated Pigment: C.I. Pigment Red 177

25 parts dianthraquinolyl red pigment (C.I. Pigment Red 177) that had been pulverized into fine particles was mixed with 480 parts quinoline, and these were thoroughly agitated and mixed with a magnetic stirrer. The mixture of pigment paste and solvent was transferred to an evaporator, where it was heated to 120° C. under a reduced pressure of 30 mmHg or less, distilling off as much of the water contained in the system as possible, after which the temperature was adjusted to 160° C. 20 parts sulfonated pyridine complex was then added and allowed to react for 8 hours, and upon comple tion of the reaction the product was washed several times with an excess of quinoline and then poured into water and filtered, which yielded a slurry of a surface-treated dianthraquinolyl red pigment in which sulfur-containing dispersibility-imparting groups such as sulfinic acid ($SO_2^-$) groups or sulfonic acid ($SO_3^-$) groups were directly introduced to the pigment surface.

In this example, polyethylene glycol (MW=2000) was further introduced as a macromolecular substance to the above-mentioned surface-treated dianthraquinolyl red pigment.

5 parts ethyl p-aminobenzoate and 3 parts concentrated nitric acid were added to 450 parts water and cooled to 5° C. under agitation. The above-mentioned surface-treated dianthraquinolyl red pigment was added to this suspension, an aqueous solution composed of 50 parts water and 2 parts sodium nitrite was slowly added and the system was agitated for 10 hours, and this product was repeatedly washed with water and filtered, which yielded a slurry of a surface-treated dianthraquinolyl red pigment in which ethyl carboxylate groups were introduced via phenyl groups.

Next, 35 parts polyethylene glycol (MW=2000) and 0.4 part diazabicycloundecene (DBU) were dissolved in 200 parts ethanol, and the surface-treated dianthraquinolyl red pigment synthesized above was gradually added and the system agitated. The pH of the mixture was adjusted to 10, and the system was refluxed for 24 hours, after which the mixture thus obtained was repeatedly washed with ethanol and filtered, which ultimately yielded a surface-treated dianthraquinolyl red pigment in which sulfur-containing dispersibility-imparting groups were directly introduced to the surface, and polyethylene oxide propylene oxide benzamide was introduced via phenyl groups.

(2) Production of Pigment Dispersion
(Dispersion Treatment Step)

3 parts Surfynol 420 (made by Air Products) and 5 parts 1,2-hexanediol as wetting agents, 2 parts propanolamine as a neutralizer, 5 parts 2-pyrrolidone as a dissolution auxiliary for the Surfynol 420, and 65 parts ion exchange water were added to 20 parts of the surface-treated dianthraquinolyl red pigment obtained in Example 8 (1), and the components were dispersed with a paint shaker (using glass beads, at a bead packing level of 60% and a medium diameter of 1.7 mm) until the average particle diameter of the pigment (the secondary particle diameter) was 95 nm, which yielded a surface-treated dianthraquinolyl red pigment dispersion in which sulfur-containing dispersibility-imparting groups were introduced (surface tension: 31 mN/m). The dispersion time was approximately 1 hour.

(3) Preparation of Ink Jet Recording Ink 1 part 1,2-hexanediol, 3 parts triethylene glycol mono-n-butyl ether, 10 parts glycerin, 5 parts triethylene glycol, and 51 parts ion exchange water were gradually added under agitation to 30 parts of the surface-treated dianthraquinolyl red pigment dispersion obtained in Example 8 (2), which yielded the ink of Example 8 of the present invention.

The ink composition was as follows.

| | |
|---|---|
| surface-treated dianthraquinolyl red pigment | 6.0% |
| Surfynol 420 | 0.9% |
| 1,2-hexanediol | 2.5% |
| 2-pyrrolidone | 1.0% |
| triethylene glycol mono-n-butyl ether | 3.0% |
| glycerin | 10.0% |
| triethylene glycol | 5.0% |
| propanolamine | 0.6% |
| ion exchange water | remainder |

(The surface-treated dianthraquinolyl red pigment, Surfynol 420, 1,2-hexanediol, 2-pyrrolidone, propanolamine, and ion exchange water in the ink composition include the portions added as the surface-treated dianthraquinolyl red pigment.)

(4) Quantification of Ions

The pigment dispersion in Example 8 (2) was measured out in the required amount and quantified by the same method as that described in Example 1 (4), which revealed the amounts of silicon, calcium, magnesium, iron, chromium, and nickel ions to be 45 ppm, 15 ppm, 45 ppm, 45ppm, 35 ppm, and 23 ppm, respectively, each of which was below 100 ppm. The total amount of polyvalent metal ions was approximately 190 ppm, which was below 600 ppm.

(5) Printing Test

Using the ink prepared in Example 8 (3), a printing test was conducted by the same method as that described in Example 1 (5).

There was almost no irregular bleeding with any of the obtained printed images, and the printed images were of good quality and high print density. Also, the dryability of the solid printed portion was extremely good.

Also, throughout the printing test there were no missing dots or deflection, and the printing was extremely stable. The power source of the printer was then left off and the same test was conducted a week later, whereupon printing started as soon as the print signal was transmitted to the printer, and no ink discharge problems such as nozzle clogging were noted.

(6) Ink Storage Stability Test

The ink prepared in Example 8 (3) was put in a glass sample bottle and tested for storage stability by the same method as that described in Example 1 (5).

There was no solid bits and no precipitation occurred before or after standing under either set of conditions, indicating that the storage stability was good.

Example 9

(1) Production of Surface-treated Pigment: Carbon Black (Surface-treating Step)

35 parts carbon black pigment ("FFW-18" made by Degussa) was mixed into 1000 parts water and then pulverized in a ball mill. To this product was added 400 parts sodium hypochlorite, and the system was agitated for 10 hours at 90 to 110° C. This product was repeatedly washed with water and filtered, which yielded a slurry of a surface-treated carbon black pigment in which carboxylic acid groups were directly introduced to the pigment surface.

(2) Production of Pigment Dispersion (Dispersion Treatment Step)

1.5 parts Surfynol 465 (made by Air Products) as a wetting agent, 0.5 part sodium hydroxide as a neutralizer, and 83 parts ion exchange water were added to 15 parts of the surface-treated carbon black obtained in Example 9 (1), and the components were dispersed with a paint shaker (using glass beads, at a bead packing level of 60% and a medium diameter of 1.7 mm) until the average particle diameter of the pigment (the secondary particle diameter) was 100 nm, which yielded a surface-treated carbon black pigment dispersion in which carboxyl groups were introduced (surface tension: 35 mN/m). The dispersion time was approximately 1 hour.

(3) Preparation of Ink Jet Recording Ink 10 parts diethylene glycol mono-n-butyl ether, 10 parts glycerin, 5 parts thiodiglycol, 0.8 part triethanolamine, and 34.2 parts ion exchange water were gradually added under agitation to 40 parts of the surface-treated carbon black pigment dispersion obtained in Example 9 (2), which yielded the ink of Example 9 of the present invention.

The ink composition was as follows.

| | |
|---|---|
| surface-treated carbon black pigment | 6.0% |
| Surfynol 465 | 0.6% |
| diethylene glycol mono-n-butyl ether | 10.0% |
| glycerin | 10.0% |
| thiodiglycol | 5.0% |
| sodium hydroxide | 0.2% |
| triethanolamine | 0.8% |
| ion exchange water | remainder |

(The surface-treated carbon black pigment, Surfynol 465, triethanolamine, and ion exchange water in the ink composition include the portions added as the surface-treated carbon black pigment.)

(4) Quantification of Ions

The pigment dispersion in Example 9 (2) was measured out in the required amount and centrifuged in a centrifugal ultrafiltration apparatus (C-15, made by Millipore). A type NMWL10000 was used as the filter, and the centrifuging conditions comprised 2500 G for 60 minutes. 10 mg of the filtrate thus obtained was treated by oxygen flask combustion method, after which it was absorbed into a 0.2% nitric acid aqueous solution. This product was then quantified by ion chromatography (ionPac AS12A column; DX-500 made by Nippon Dionex), which revealed the amounts of silicon, calcium, magnesium, iron, chromium, and nickel ions to be 50 ppm, 32 ppm, 20 ppm, 45 ppm, 33 ppm, and 15 ppm, respectively, each of which was below 100 ppm. The total amount of polyvalent metal ions was approximately 200 ppm, which was below 1000 ppm.

(5) Printing Test

Using the ink prepared in Example 9 (3), a printing test was conducted by the same method as that described in Example 1 (5).

There was almost no irregular bleeding with any of the obtained printed images, and the printed images were of extremely good quality and high print density. Also, the dryability of the solid printed portion was extremely good.

Also, throughout the printing test there were no missing dots or deflection, and the printing was extremely stable. The power source of the printer was then left off and the same test was conducted a week later, whereupon printing started as soon as the print signal was transmitted to the printer, and no ink discharge problems such as nozzle clogging were noted.

(6) Ink Storage Stability Test

The ink prepared in Example 9 (3) was put in a glass sample bottle and tested for storage stability by the same method as that described in Example 1 (5).

There was no solid bits and no precipitation occurred before or after standing under either set of conditions, indicating that the storage stability was extremely good.

Example 10

(1) Production of Surface-treated Pigment: Carbon Black (Surface-treating Step)

20 parts carbon black ("FW-200" made by Degussa) was mixed into 200 parts water and then pulverized in a ball mill. To this product was added 7 parts p-aminobenzenesulfonic acid and 3 parts nitric acid, and the system was agitated for several hours at 76° C. To this was added a 20% sodium nitrite aqueous solution, and the syste m was agitated for ano ther hour. This product was repeatedly washed with water and filtered, which yielded a slurry of a surface-treated carbon black pigment in which carboxylic acid groups were introduced via phenyl groups.

(2) Production of Pigment Dispersion (Dispersion Treatment Step)

2 parts Fluorad 430 (made by Sumitomo 3M) and 5 parts ethylene glycol monoethyl ether as wetting agents, 2 parts diethanolamine as a neutralizer, and 71 parts ion exchange water were added to 20 parts of the surface-treated carbon black obtained in Example 10 (1), and the components were dispersed with a paint shaker (using glass beads, at a bead packing level of 60% and a medium diameter of 1.7 mm) until the average particle diameter of the pigment (the secondary particle diameter) was 110 nm, which yielded a surface-treated carbon black pigment dispersion (surface tension: 25 mN/m). The dispersion time was approximately 1.5 hours.

(3) Preparation of ink jet recording ink 0.5 part Surfynol TG (made by Air Products), 8 parts 2-pyrrolidone , 15 parts g lycerin, and 46.5 parts ion exchange water were gradually added under agitation to 30 parts of the surface-treated carbon black pigment dispersion obtained in Example 10 (2), which yielded the ink of Example 10 of the present invention.

The ink composition was as follows.

| | |
|---|---|
| surface-treated carbon black pigment | 6.0% |
| Fluorad 430 | 0.6% |
| Surfynol TG | 0.5% |
| 2-pyrrolidone | 8.0% |
| ethylene glycol monoethyl ether | 5.0% |
| glycerin | 15.0% |
| diethanolamine | 0.6% |
| ion exchange water | remainder |

(The surface-treated carbon black pigment, Fluorad 430, ethylene glycol monoethyl ether, diethanolamine, and ion exchange water in the ink composition include the portions added as the surface-treated carbon black pigment.)

(4) Quantification of Ions

The pigment dispersion in Example 10 (2) was measured out in the required amount and quantified by the same method as that described in Example 1 (4), which revealed the amounts of silicon, calcium, magnesium, iron, chromium, and nickel ions to be 98 ppm, 65 ppm, 25 ppm, 38 ppm, 41 ppm, and 22 ppm, respectively, each of which was below 100 ppm. The total amount of polyvalent metal ions was approximately 290 ppm, which was below 600 ppm.

(5) Printing Test

Using the ink prepared in Example 10 (3), a printing test was conducted by the same method as that described in Example 1 (5).

There was almost no irregular bleeding with any of the obtained printed images, and the printed images were of extremely good quality and high print density. Also, the dryability of the solid printed portion was extremely good.

Also, throughout the printing test there were no missing dots or deflection, and the printing was extremely stable. The power source of the printer was then left off and the same test was conducted a week later, whereupon missing dots were confirmed for a number of nozzles immediately after the print signal was transmitted to the printer. This was remedied by cleaning a few times. The clogging was therefore not serious enough to pose any practical problem.

(6) Ink Storage Stability Test

The ink prepared in Example 10 (3) was put in a glass sample bottle and tested for storage stability by the same method as that described in Example 1 (5).

A small amount of solid bits was noted, but this was not serious enough to pose a practical problem. Almost no precipitation occurred, so there was no problem with storage stability.

Example 11

(1) Production of Surface-treated Pigment: C.I. Pigment Green 7

(Surface-treating Step)

20 parts phthalocyanine green pigment (C.I. Pigment Green 7) that had been pulverized into fine particles was mixed with 5 parts p-aminobenzenesulfonic acid and heated to 70° C. An aqueous solution of 2 parts sodium nitrite in 80 parts water was quickly added to this mixture to create a pigment slurry. A hydrogen chloride aqueous solution was added to this slurry to bring the pH to 2, and the system was agitated for 1 hour and repeatedly washed with water and filtered, which yielded a slurry of a surface-treated phthalocyanine green pigment in which sulfonic acid groups were introduced via phenyl groups.

(2) Production of Pigment Dispersion
(Dispersion Treatment Step)

3 parts FZ-2161 (made by Nippon Unicar) and 2 parts dipropylene glycol mono-n-butyl ether as wetting agents, 2 parts monoethanolamine as a neutralizer, and 78 parts ion exchange water were added to 15 parts of the surface-treated phthalocyanine green pigment obtained in Example 11 (1), and the components were dispersed with a paint shaker (using zirconia beads, at a bead packing level of 60% and a medium diameter of 1.7 mm) until the average particle diameter of the pigment (the secondary particle diameter) was 110 nm, which yielded a surface-treated phthalocyanine green pigment dispersion in which sulfonic acid groups were introduced via phenyl groups (surface tension: 29 mN/m). The dispersion time was approximately 1 hour.

(3) Preparation of Ink Jet Recording Ink 1.4 parts dipropylene glycol mono-n-butyl ether, 5 parts 2-pyrrolidone, 10 parts glycerin, 5 parts ethylene glycol, and 58.6 parts ion exchange water were gradually added under agitation to 20 parts of the surface-treated phthalocyanine green pigment dispersion obtained in Example 11 (2), which yielded the ink of Example 11 of the present invention.

The ink composition was as follows.

| | |
|---|---|
| surface-treated phthalocyanine green pigment | 3.0% |
| FZ-2161 | 0.6% |
| dipropylene glycol mono-n-butyl ether | 2.0% |
| 2-pyrrolidone | 5.0% |
| glycerin | 10.0% |
| ethylene glycol | 5.0% |
| monoethanolamine | 0.4% |
| ion exchange water | remainder |

(The surface-treated phthalocyanine green pigment, FZ-2161, dipropylene glycol mono-n-butyl ether, monoethanolamine, and ion exchange water in the ink composition include the portions added as the surface-treated phthalocyanine green pigment.)

(4) Quantification of Ions

The pigment dispersion in Example 11 (2) was measured out in the required amount and quantified by the same method as that described in Example 1 (4), which revealed the amounts of silicon, calcium, magnesium, iron, chromium, and nickel ions to be 15 ppm, 56 ppm, 61 ppm, 68 ppm, 79 ppm, and 96 ppm, respectively, each of which was below 100 ppm. The total amount of polyvalent metal ions was approximately 380 ppm, which was below 600 ppm.

(5) Printing Test

Using the ink prepared in Example 11 (3), a printing test was conducted by the same method as that described in Example 1 (5).

A small amount of irregular bleeding occurred in the obtained printed images thus obtained, and the print density did appear slightly faint, but all of the characters were plainly visible enough for practical purposes. The dryability of the solid printed portion was somewhat slow, but this was not serious enough to pose a practical problem.

Also, throughout the printing test there were no missing dots or deflection, and the printing was extremely stable. The power source of the printer was then left off and the same test was conducted a week later, whereupon missing dots were confirmed for a number of nozzles immediately after the print signal was transmitted to the printer. This was remedied by cleaning a few times. The clogging was therefore not serious enough to pose any practical problem.

(6) Ink Storage Stability Test

The ink prepared in Example 11 (3) was put in a glass sample bottle and tested for storage stability by the same method as that described in Example 1 (5).

A minute amount of solid bits was seen when the ink was left at high temperature, but this was not serious enough to pose a practical problem. A certain amount of precipitation did occur, but posed no practical problem whatsoever.

Example 12

(1) Production of Surface-treated Pigment: C.I. Pigment Brown 32
(Surface-treating Step)

Other than using a benzimidazolone brown pigment (C.I. Pigment Brown 32) as the pigment in Example 12 (1), a surface-treated benzimidazolone brown pigment in which sulfonic acid groups were introduced via phenyl groups was obtained in exactly the same manner as in Example 11 (1).

(2) Production of Pigment Dispersion
(Dispersion Treatment Step)

10 parts triethylene glycol mono-n-butyl ether as a wetting agent, 3 parts triethanolamine as a neutralizer, and 57 parts ion exchange water were added to 30 parts of the surface-treated benzimidazolone brown pigment obtained in Example 12 (1), and the components were dispersed with a paint shaker (using zirconia beads, at a bead packing level of 60% and a medium diameter of 1.7 mm) until the average particle diameter of the pigment (the secondary particle diameter) was 120 nm, which yielded a surface-treated benzimidazolone brown pigment dispersion (surface tension: 39 mN/m). The dispersion time was approximately 2 hours.

(3) Preparation of Ink Jet Recording Ink 1 part Surfynol 465 (made by Air Products), 15 parts glycerin, and 64 parts ion exchange water were gradually added under agitation to 20 parts of the surface-treated benzimidazolone brown pigment dispersion obtained in Example 12 (2), which yielded the ink of Example 12 of the present invention.

The ink composition was as follows.

| | |
|---|---|
| surface-treated benzimidazolone brown pigment | 6.0% |
| Surfynol 465 | 1.0% |
| triethylene glycol mono-n-butyl ether | 2.0% |
| glycerin | 15.0% |
| triethanolamine | 0.6% |
| ion exchange water | remainder |

(The surface-treated benzimidazolone brown pigment, triethylene glycol mono-n-butyl ether, triethanolamine, and ion exchange water in the ink composition include the portions added as the surface-treated benzimidazolone brown pigment.)

(4) Quantification of Ions

The pigment dispersion in Example 12 (2) was measured out in the required amount and quantified by the same method as that described in Example 1 (4), which revealed the amounts of silicon, calcium, magnesium, iron, chromium, and nickel ions to be 61 ppm, 45 ppm, 65 ppm, 48 ppm, 19 ppm, and 32 ppm, respectively, each of which was below 100 ppm. The total amount of polyvalent metal ions was approximately 270 ppm, which was below 600 ppm.

(5) Printing Test

Using the ink prepared in Example 12 (3), a printing test was conducted by the same method as that described in Example 1 (5).

There was almost no irregular bleeding with any of the obtained printed images, and the printed images were of good quality and high print density. Also, the dryability of the solid printed portion was extremely good.

Also, throughout the printing test there were no missing dots or deflection, and the printing was extremely stable. The power source of the printer was then left off and the same test was conducted a week later, whereupon missing dots were confirmed for a number of nozzles immediately after the print signal was transmitted to the printer. This was remedied by cleaning a few times. The clogging was therefore not serious enough to pose any practical problem.

(6) Ink Storage Stability Test

The ink prepared in Example 12 (3) was put in a glass sample bottle and tested for storage stability by the same method as that described in Example 1 (5).

A small amount of solid bits was produced and a small amount of precipitation occurred under all conditions, but these were not serious enough to pose a practical problem.

Example 13

(1) Production of Surface-treated Pigment: C.I. Pigment Red 149
(Surface Treatment Step)

50 parts perylene scarlet pigment (C.I. Pigment Red 149) that had been pulverized into fine particles was mixed with 6 parts p-aminobenzenesulfonic acid. 1.5 parts concentrated nitric acid and 200 parts water were added to this mixture and cooled to 5° C., and then an aqueous solution composed of 1.2 parts sodium nitrite and 50 parts water was slowly added and the system was agitated. This mixture was heated and agitated for 8 hours at 70° C., and after the reaction, the product was repeatedly washed with water and filtered to obtain a pigment slurry.

To this slurry were added 6 parts ethyl p-aminobenzoate, 1.5 parts concentrated nitric acid, 1.2 parts sodium nitrite, and 200 parts water, and a reaction was conducted and the product was repeatedly washed with water and filtered the same as above, which yielded a slurry of a surface-treated perylene scarlet pigment in which carboxylic acid and ethyl carboxylate groups were introduced via phenyl groups.

In this example, polyethylene glycol (MW=2000) was further introduced as a macromolecular substance to the above-mentioned surface-treated perylene scarlet pigment.

40 parts polyethylene glycol (MW=2000) and 0.3 part diazabicycloundecene (DBU) were dissolved in 100 parts ethanol, and the surface-treated perylene pigment synthesized above was gradually added and the system agitated. The pH of the mixture was adjusted to 10, and the system was refluxed for 24 hours, after which the mixture thus obtained was repeatedly washed with ethanol and filtered, which ultimately yielded a surface-treated perylene scarlet pigment in which carboxylic acid and polyethylene oxide polypropylene oxide benzamide were introduced via phenyl groups.

(2) Production of Pigment Dispersion
(Dispersion Treatment Step)

1 part Surfynol 61 (made by Air Products), 4 parts Surfynol 465 (made by Air Products), and 2 parts propylene glycol mono-n-butyl ether as wetting agents, 2 parts triethanolamine as a neutralizer, and 74 parts ion exchange water were added to 20 parts of the surface-treated perylene scarlet pigment obtained in Example 13 (1), and the components were dispersed with a paint shaker (using glass beads, at a bead packing level of 60% and a medium diameter of 1.7 mm) until the average particle diameter of the pigment (the secondary particle diameter) was 95 nm, which yielded a surface-treated perylene scarlet pigment dispersion (surface tension: 31 mN/m). The dispersion time was approximately 1 hour.

(3) Preparation of Ink Jet Recording Ink 0.4 part Surfynol TG (made by Air Products), 1.6 parts propylene glycol mono-n-butyl ether, 5 parts 2-pyrrolidone, 5 parts glycerin, 10 parts diethylene glycol, and 58 parts ion exchange water were gradually added under agitation to 20 parts of the surface-treated perylene scarlet pigment dispersion obtained in Example 13 (2), which yielded the ink of Example 13 of the present invention.

The ink composition was as follows.

| | |
|---|---|
| surface-treated perylene scarlet pigment | 4.0% |
| surfynol 61 | 0.2% |
| Surfynol 465 | 0.2% |
| Surfynol TG | 0.4% |
| propylene glycol mono-n-butyl ether | 2.0% |
| 2-pyrrolidone | 5.0% |
| glycerin | 5.0% |
| diethylene glycol | 10.0% |
| triethanolamine | 0.4% |
| ion exchange water | remainder |

(The surface-treated perylene scarlet pigment, Surfynol 61, Surfynol 465, propylene glycol mono-n-butyl ether, triethanolamine, and ion exchange water in the ink composition include the portions added as the surface-treated perylene scarlet pigment.)

(4) Quantification of Ions

The pigment dispersion in Example 13 (2) was measured out in the required amount and quantified by the same method as that described in Example 1 (4), which revealed the amounts of silicon, calcium, magnesium, iron, chromium, and nickel ions to be 58 ppm, 15 ppm, 86 ppm, 28 ppm, 23 ppm, and 19 ppm, respectively, each of which was below 100 ppm. The total amount of polyvalent metal ions was approximately 230 ppm, which was below 600 ppm.

(5) Printing Test

Using the ink prepared in Example 13 (3), a printing test was conducted by the same method as that described in Example 1 (5).

There was almost no irregular bleeding with any of the obtained printed images, and the printed images were of good quality and high print density. Also, the dryability of the solid printed portion was extremely good.

Also, throughout the printing test there were no missing dots or deflection, and the printing was extremely stable. The power source of the printer was then left off and the same test was conducted a week later, whereupon printing started as soon as the print signal was transmitted to the printer, and no ink discharge problems such as nozzle clogging were noted.

(6) Ink Storage Stability Test

The ink prepared in Example 13 (3) was put in a glass sample bottle and tested for storage stability by the same method as that described in Example 1 (5).

There was almost no solid bits and no precipitation occurred before or after standing under either set of conditions, indicating that the storage stability was extremely good.

Example 14

(1) Production of Surface-treated Pigment: C.I. Pigment Orange 36

(Surface Treatment Step)

20 parts benzimidazolone orange pigment (C.I. Pigment Orange 36) that had been pulverized into fine particles and 62 parts p-amino-N-ethyl pyridinium bromide were mixed and dispersed in 150 parts water, to which 32 parts nitric acid was added dropwise, and the system was agitated for 5 minutes at 75° C. An aqueous solution of sodium nitrite was added, and agitation was continued for another 2 hours. The product was repeatedly washed with water and filtered, [7] which yielded a slurry of a surface-treated benzimidazolone orange pigment in which N-ethylpyridyl groups were introduced via phenyl groups.

(2) Production of Pigment Dispersion (Dispersion Treatment Step)

1 part Hitenol [uncertain spelling] N07 (made by Daiichi Kogyo Seiyaku) as a wetting agent, 5 parts triethanolamine as a neutralizer, and 34 parts ion exchange water were added to 50 parts of the surface-treated benzimidazolone orange pigment obtained in Example 14 (1), and the components were dispersed with a paint shaker (using zirconia beads, at a bead packing level of 60% and a medium diameter of 1.7 mm) until the average particle diameter of the pigment (the secondary particle diameter) was 110 nm, which yielded a surface-treated benzimidazolone orange pigment dispersion (surface tension: 39 mN/m). The dispersion time was approximately 3 hours.

(3) Preparation of Ink Jet Recording Ink 1 part Surfynol 465 (made by Air Products), 15 parts glycerin, and 74 parts ion exchange water were gradually added under agitation to 10 parts of the surface-treated benzimidazolone orange pigment dispersion obtained in Example 14 (2), which yielded the ink of Example 14 of the present invention.

The ink composition was as follows.

| | |
|---|---|
| surface-treated benzimidazolone orange pigment | 6.0% |
| Surfynol 465 | 1.0% |
| Hitenol N07 | 0.1% |
| glycerin | 15.0% |
| triethanolamine | 0.5% |
| ion exchange water | remainder |

(The surface-treated benzimidazolone orange pigment, Hitenol N07, triethanolamine, and ion exchange water in the ink composition include the portions added as the surface-treated benzimidazolone orange pigment.)

(4) Quantification of Ions

The pigment dispersion in Example 14 (2) was measured out in the required amount and quantified by the same method as that described in Example 1 (4), which revealed the amounts of silicon, calcium, magnesium, iron, chromium, and nickel ions to be 91 ppm, 95 ppm, 85 ppm, 98 ppm, 89 ppm, and 86 ppm, respectively, each of which was below 100 ppm. The total amount of polyvalent metal ions was approximately 550 ppm, which was close to 600 ppm.

(5) Printing Test

Using the ink prepared in Example 14 (3), a printing test was conducted by the same method as that described in Example 1 (5).

There was very little irregular bleeding with any of the obtained printed images, and the printed images were of good quality and relatively high print density. Also, the dryability of the solid printed portion was extremely good.

However, missing dots and deflection occurred in the course of the printing test, but these were soon remedied by cleaning. The power source of the printer was then left off and the same test was conducted a week later, whereupon missing dots were confirmed for a number of nozzles immediately after the print signal was transmitted to the printer. This was remedied by cleaning a few times. The clogging was therefore not serious enough to pose any practical problem.

(6) Ink Storage Stability Test

The ink prepared in Example 14 (3) was put in a glass sample bottle and tested for storage stability by the same method as that described in Example 1 (5).

A small amount of solid bits was produced and a small amount of precipitation occurred under all conditions, but these were not serious enough to pose a practical problem.

Example 15

(1) Production of Surface-treated Pigment

A surface-treated carbon black pigment in which sulfur-containing dispersibility-imparting groups were introduced directly to the surface, which was prepared in Example 1 (1) above, was used again in this Example 15.

(2) Production of Pigment Dispersion (Dispersion Treatment Step)

25 parts Surfynol 82W (made by Air Products) as a wetting agent, 2 parts monoethanolamine as a neutralizer, and 63 parts ion exchange water were added to 10 parts of the surface-treated carbon black pigment obtained in Example 1 (1), and the components were dispersed with a paint shaker (using glass beads, at a bead packing level of 60% and a medium diameter of 1.7 mm) until the average particle diameter of the pigment (the secondary particle diameter) was 100 nm, which yielded a surface-treated carbon black pigment dispersion (surface tension: 29 mN/m). The dispersion time was approximately 1 hour.

(3) Preparation of Ink Jet Recording Ink 2 parts triethylene glycol mono-n-butyl ether, 15 parts glycerin, and 5 parts ion exchange water were gradually added under agitation to 60 parts of the surface-treated carbon black pigment dispersion obtained in Example 15 (2), which yielded the ink of Example 15 of the present invention.

The ink composition was as follows.

| | |
|---|---|
| surface-treated carbon black pigment | 6.0% |
| Surfynol 82W | 15.0% |
| triethylene glycol mono-n-butyl ether | 2.0% |
| glycerin | 15.0% |
| monoethanolamine | 1.2% |
| ion exchange water | remainder |

(The surface-treated carbon black pigment, Surfynol 82W, monoethanolamine, and ion exchange water in the ink composition include the portions added as the surface-treated carbon black pigment.)

(4) Quantification of Ions

The pigment dispersion in Example 15 (2) was measured out in the required amount and quantified by the same method as that described in Example 1 (4), which revealed the amounts of silicon, calcium, magnesium, iron, chromium, and nickel ions to be 75 ppm, 60 ppm, 105 ppm, 48 ppm, 65 ppm, and 36 ppm, respectively, and only the amount of magnesium was over 100 ppm. The total amount of polyvalent metal ions was approximately 390 ppm, which was below 600 ppm.

(5) Printing Test

Using the ink prepared in Example 15 (3), a printing test.was conducted by the same method as that described in Example 1 (5).

Compared to the results in Example 1 (5), slightly more deflection occurred during the printing test, but not enough to pose a practical problem. The power source of the printer was then left off and the same test was conducted a week later, and compared to the results in Example 1 (5), there was again slightly more deflection noted, but stable discharge was still obtained.

(6) Ink Storage Stability Test

The ink prepared in Example 15 (3) was put in a glass sample bottle and tested for storage stability by the same method as that described in Example 1 (5).

A small amount of solid bits was produced and a small amount of precipitation occurred under all conditions, but these were not serious enough to pose a practical problem.

Example 16

(1) Production of Surface-treated Pigment

The surface-treated phthalocyanine blue pigment prepared in Example 2 (1) above was used in this Example 16.

(2) Production of Pigment Dispersion (Dispersion Treatment Step)

0.05 part Surfynol 465 (made by Air Products) as a wetting agent, 2 parts monoethanolamine as a neutralizer, and 92.95 parts ion exchange water were added to 5 parts of the surface-treated phthalocyanine blue pigment obtained in Example 2 (1), and the components were dispersed with a paint shaker (using glass beads, at a bead packing level of 60% and a medium diameter of 1.7 mm). The dispersion was halted after about 1 hour, regardless of the average particle diameter of the pigment (the secondary particle diameter), which yielded a surface-treated phthalocyanine blue pigment dispersion (surface tension: 52 mN/m) with an average particle diameter (secondary particle diameter) of 205 nm.

(3) Preparation of Ink Jet Recording Ink 0.96 part Surfynol (made by Air Products), 15 parts glycerin, and 4.04 parts ion exchange water were gradually added under agitation to 80 parts of the surface-treated phthalocyanine blue pigment dispersion obtained in Example 16 (2), which yielded the ink of Example 16 of the present invention.

The ink composition was as follows.

| | |
|---|---|
| surface-treated phthalocyanine blue pigment | 4.0% |
| Surfynol 465 | 1.0% |
| glycerin | 15.0% |
| monoethanol amine | 1.6% |
| ion exchange water | remainder |

(The surface-treated phthalocyanine blue pigment, Surfynol 465, monoethanolamine, and ion exchange water in the ink composition include the portions added as the surface-treated phthalocyanine blue pigment.)

(4) Quantification of Ions

The pigment dispersion in Example 16 (2) was measured out in the required amount and quantified by the same method as that described in Example 1 (4), which revealed the amounts of silicon, calcium, magnesium, iron, chromium, and nickel ions to be 55 ppm, 48 ppm, 69 ppm, 52 ppm, 35 ppm, and 43 ppm, respectively, each of which was below 100 ppm. The total amount of polyvalent metal ions was approximately 310 ppm, which was below 600 ppm.

(5) Printing Test

Using the ink prepared in Example 16 (3), a printing test was conducted by the same method as that described in Example 1 (5).

A very slight amount of clogging was noted during the printing test, but not enough to pose a practical problem. The power source of the printer was then left off and the same test was conducted a week later, and again slight clogging occurred, but stable discharge was still obtained.

(6) Ink Storage Stability Test

The ink prepared in Example 16 (3) was put in a glass sample bottle and tested for storage stability by the same method as that described in Example 1 (5).

A small amount of precipitation occurred under all conditions, leaving a trace amount at the bottom of the sample bottle, but this was not serious enough to pose a practical problem.

Example 17

(1) Production of Surface-treated Pigment

The surface-treated carbon black pigment prepared in Example 10 (1) above was used in this Example 17.

(2) Production of Pigment Dispersion
(Dispersion Treatment Step)

10 parts isopropyl alcohol as a wetting agent, 2 parts monoethanolamine as a neutralizer, and 73 parts ion exchange water were added to 15 parts of the surface-treated carbon black pigment obtained in Example 10 (1), and the components were dispersed with a paint shaker (using zirconia beads, at a bead packing level of 60% and a medium diameter of 1.7 mm). The dispersion was continued until the average particle diameter of the pigment (the secondary particle diameter) was 100 nm, which yielded a surface-treated carbon black pigment dispersion (surface tension: 63 mN/m). The dispersion time was approximately 10 hours. (Isopropyl alcohol is a dispersion additive that is commonly used with a pigment dispersion in which the pigment is dispersed using a resin dispersant.)

(3) Preparation of Ink Jet Recording Ink 1 part Surfynol 465 (made by Air Products), 15 parts glycerin, and 44 parts ion exchange water were gradually added under agitation to 40 parts of the surface-treated carbon black pigment dispersion-obtained in Example 17 (2), which yielded the ink of Example 17 of the present invention.

The ink composition was as follows.

| | |
|---|---|
| surface-treated carbon black pigment | 6.0% |
| Surfynol 465 | 1.0% |
| isopropyl alcohol | 4.0% |
| glycerin | 15.0% |
| monoethanolamine | 0.8% |
| ion exchange water | remainder |

(The surface-treated carbon black pigment, isopropyl alcohol, monoethanolamine, and ion exchange water in the ink composition include the portions added as the surface-treated carbon black pigment.)

(4) Quantification of Ions

The pigment dispersion in Example 17 (2) was measured out in the required amount and quantified by the same method as that described in Example 1 (4), which revealed the amounts of silicon, calcium, magnesium, iron, chromium, and nickel ions to be 90 ppm, 101 ppm, 88 ppm, 107 ppm, 103 ppm, and 110 ppm, respectively, which all exceeded 100 ppm except for silicon and magnesium. The total amount of polyvalent metal ions was approximately 600 ppm.

(5) Printing Test

Using the ink prepared in Example 17 (3), a printing test was conducted by the same method as that described in Example 1 (5).

A very slight amount of deflection was noted during the printing test. Furthermore, the power source of the printer was left off and the same test was conducted a week later, and again a slight amount of deflection occurred, but there was no problem with practical usage.

(6) Ink Storage Stability Test

The ink prepared in Example 17 (3) was put in a glass sample bottle and tested for storage stability by the same method as that described in Example 1 (5).

Solid bits and a minute change in properties were noted under all conditions. In particular, trace amounts of solid bits and sediment thought to be agglomerated pigment were noted, but were not serious enough to pose a practical problem.

Comparative Example 1

(1) Production of Surface-treated Pigment

The surface-treated carbon black pigment prepared in Example 10 (1) above was used in this Comparative Example 1.

(2) Production of Pigment Dispersion
(Dispersion Treatment Step)

2 parts monoethanolamine as a neutralizer and 83 parts ion exchange water were added to 15 parts of the surface-treated carbon black pigment obtained in Example 10 (1), and the components were dispersed with a paint shaker (using zirconia beads, at a bead packing level of 60% and a medium diameter of 1.7 mm). Therefore, no wetting agent was used in this comparative example. The dispersion was continued until the average particle diameter of the pigment (the secondary particle diameter) was 100 nm, which yielded a surface-treated carbon black pigment dispersion (surface tension: 70 mN/m). The dispersion time was approximately 12 hours.

(3) Preparation of Ink Jet Recording Ink 1 part Surfynol 465 (made by Air Products), 10 parts triethylene glycol mono-n-butyl ether, 15 parts glycerin, and 65 parts ion exchange water were gradually added under agitation to 40 parts of the surface-treated carbon black pigment dispersion obtained in Comparative Example 1 (2), which yielded the ink of Comparative Example 1 of the present invention.

The ink composition was as follows.

| | |
|---|---|
| surface-treated carbon black pigment | 6.0% |
| Surfynol 465 | 1.0% |
| triethylene glycol mono-n-butyl ether | 10.0% |
| glycerin | 15.0% |
| monoethanolamine | 0.8% |
| ion exchange water | remainder |

(The surface-treated carbon black pigment, monoethanolamine, and ion exchange water in the ink composition include the portions added as the surface-treated carbon black pigment.)

(4) Quantification of Ions

The pigment dispersion in Comparative Example 1 (2) was measured out in the required amount and quantified by the same method as that described in Example 1 (4), which revealed the amounts of silicon, calcium, magnesium, iron, chromium, and nickel ions to be 109 ppm, 115 ppm, 112 ppm, 128 ppm, 139 ppm, and 150 ppm, respectively, which all exceeded 100 ppm. The total amount of polyvalent metal ions was approximately 750 ppm, that is, over 600 ppm.

(5) Printing Test

Using the ink prepared in Comparative Example 1 (3), a printing test was conducted by the same method as that described in Example 1 (5).

However, because deflection occurred throughout the printing test, evaluation of the printed image was impossible. Furthermore, the power source of the printer was left off and the same test was conducted a week later, and again deflection occurred so often that stable discharge could not be achieved and evaluation could not be conducted.

(6) Ink Storage Stability Test

The ink prepared in Comparative Example 1 (3) was put in a glass sample bottle and tested for storage stability by the same method as that described in Example 1 (5).

Solid bits and a minute change in properties-were noted under all conditions. In particular, trace amounts of solid bits and sediment thought to be agglomerated pigment were noted, and were serious enough to pose a practical problem.

INDUSTRIAL APPLICABILITY

As discussed above, using the method for manufacturing a pigment dispersion according to the present invention, and a pigment dispersion obtained by this method, makes it possible to obtain an ink jet printer-use pigment that can be used to advantage in a modern ink jet printer having an ink jet head that is driven at a high frequency and a small nozzle diameter for the sake of higher image quality and speed. Furthermore, the ink of the present invention has excellent storage stability and affords better printed images, and the dryability of the printed images is also superior.

What is claimed is:

1. A method for manufacturing a pigment dispersion, comprising the steps of:

surface-treating a pigment with introduction of at least one hydrophilic, dispersibility-imparting group to a surface of the pigment directly and/or via a polyvalent group to form a self-dispersing pigment; and forming a mixture by dispersing the self-dispersing pigment obtained in said surface-treating step in an aqueous medium, said mixture comprising
   at least the self-dispersing pigment, a wetting agent, and water, wherein a surface tension of the mixture is no more than 40 mN/m.

2. The method for manufacturing a pigment dispersion according to claim 1, wherein a pigment concentration of the mixture in the dispersion step is no more than 50 wt %.

3. The method for manufacturing a pigment dispersion according to claim 1, wherein the wetting agent in the dispersion step is one or more substances selected from the group consisting of acetylene glycols, acetylene alcohols, glycol ethers, and alkylene glycols.

4. The method for manufacturing a pigment dispersion according to claim 1, wherein a total amount of acetylene glycol and/or acetylene alcohol added as a wetting agent in the dispersion step is at least 1/50 and is not more than 2 times the amount of pigment by weight.

5. The method for manufacturing a pigment dispersion according to claim 4, wherein the acetylene glycol and acetylene alcohol are compounds expressed by the following Formulas I and II:

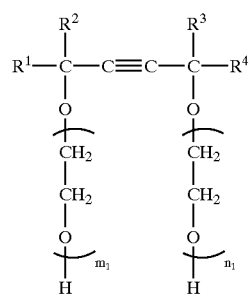

(where $R^1$, $R^2$, $R^3$, and $R^4$ are each independently an alkyl group, and $m_1+n_1$ is a number from 0 to 30)

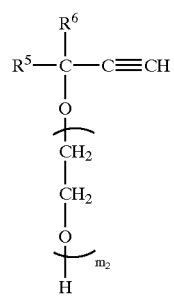

(where $R^1$ and $R^6$ are each independently an alkyl group, and $m_2$ is a number from 0 to 30).

6. The method for manufacturing a pigment dispersion according to claim 1, wherein the hydrophilic, dispersibility-imparting group introduced to the pigment surface directly and/or via the polyvalent group in said surface treating step is selected from the group consisting of one or more functional groups expressed by the following formulas and salts thereof: —OM, —COOM, —CO—, —$SO_3M$—, —$SO_2M$, —$SO_2NH_2$, —$RSO_2M$, —$PO_3HM$, —$PO_3M_2$, —$SO_2NHCOR$, —$NH_3$, —$NR_3$, wherein M is a hydrogen atom, an alkali metal, ammonium, or organic ammonium, and R is a $C_1$ to $C_{12}$ alkyl group, a phenyl group which may have a substituent, or a naphthyl group which may have a substituent.

7. The method for manufacturing a pigment dispersion according to claim 1, wherein the hydrophilic, dispersibility-imparting group introduced to the pigment surface directly and/or via the polyvalent group in said surface-treating step is a sulfur-containing dispersibility-imparting group.

8. The method for manufacturing a pigment dispersion according to claim 1, wherein a total amount of polyvalent metal ions contained in the liquid components of the pigment dispersion manufactured by the above manufacturing method is 600 ppm or less.

9. The method for manufacturing a pigment dispersion according to claim 1, wherein amounts of silicon, calcium, magnesium, iron, chromium, and nickel ions contained in liquid components of the pigment dispersion are each 100 ppm or less.

10. The method for manufacturing a pigment dispersion according to claim 1, wherein the pigment in which the hydrophilic, dispersibility-imparting group has been introduced directly and/or via the polyvalent group in said surface-treating step is a carbon black pigment and/or an organic pigment.

11. The method for manufacturing a pigment dispersion according to claim 1, wherein the pigment in which the hydrophilic, dispersibility-imparting group has been introduced directly and/or via the polyvalent group in said surface-treating step is one or more pigments selected from the group consisting of C.I. pigment yellow, C.I. pigment red, C.I. pigment violet, C.I. pigment blue, C.I. pigment red, C.I. pigment violet, C.I. pigment blue, C.I. pigment orange, C.I. pigment green, and C.I. pigment brown.

12. The method for manufacturing a pigment dispersion according to claim 1, wherein the pigment in which the hydrophilic, dispersibility-imparting group has been introduced directly and/or via the polyvalent group in said surface-treating step is one or more pigments selected from the group consisting of phthalocyanine pigment, quinacridone pigment, condensed azo pigment, isoindolinone pigment, quinophthalone pigment, anthraquinone pigment, benzimidazolone pigment, and perylene pigment.

13. The method for manufacturing a pigment dispersion according to claim 1, wherein a macromolecular substance is introduced to the pigment surface directly or via the polyvalent group in said surface-treating step.

14. A pigment dispersion obtained by the manufacturing method according to claim 1.

15. A pigment dispersion obtained by the method of claim 5.

16. An ink jet recording ink, comprising the pigment dispersion according to claim 14.

17. An ink jet recording method, comprising ejecting from a recording head the ink according to claim 16 to which an energy is imparted so that the ink is deposited to a recording medium.

18. The ink jet recording method according to claim 17, wherein-the energy is a mechanical energy.

19. The ink jet recording method according to claim 17, wherein the energy is a thermal energy.

20. A recording product obtained by the recording method according to claim 17.

* * * * *